United States Patent
Orolin et al.

(10) Patent No.: US 6,391,184 B1
(45) Date of Patent: *May 21, 2002

(54) DECONTAMINATION METHOD AND SYSTEM, SUCH AS AN IN-SITU GROUNDWATER DECONTAMINATION SYSTEM, PRODUCING DISSOLVED OXYGEN AND REACTIVE INITIATORS

(75) Inventors: John J. Orolin; Vaughn A. Sucevich, Sr., both of West Linn; Troy T. Johnson, Portland, all of OR (US); Scott A. Schorzman, Brier, WA (US)

(73) Assignee: H2O Technologies, Ltd., Milwaukie, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/634,693

(22) Filed: Aug. 8, 2000

Related U.S. Application Data

(63) Continuation-in-part of application No. 09/466,105, filed on Dec. 17, 1999, now Pat. No. 6,332,972.
(51) Int. Cl.[7] .............................................. C02F 1/461
(52) U.S. Cl. ..................... 205/687; 205/688; 205/701; 205/742; 204/242; 204/275.1; 204/278
(58) Field of Search ................................ 204/687, 688, 204/701, 742, 242, 275.1, 278

(56) References Cited

U.S. PATENT DOCUMENTS

| | | | |
|---|---|---|---|
| 5,324,398 A | 6/1994 | Erickson et al. | 204/149 |
| 5,326,439 A | 7/1994 | Brewster | 204/149 |
| 5,328,584 A | 7/1994 | Erickson et al. | 204/229 |
| 5,728,287 A | 3/1998 | Hough et al. | 205/743 |
| 5,874,001 A | 2/1999 | Carter | 210/610 |
| 5,911,870 A | 6/1999 | Hough | 205/701 |
| 5,957,196 A | 9/1999 | Gibson et al. | 166/163 |

*Primary Examiner*—Arun S. Phasge
(74) *Attorney, Agent, or Firm*—Seed Intellectual Property Law Group PLLC

(57) ABSTRACT

An apparatus for decontamination contaminated groundwater in-situ by increasing the quantity of dissolved oxygen in the contaminated groundwater and generating reactive initiators to remediate the contaminated groundwater. The apparatus includes a submersible pump, an electrolytic cell, a chlorine filter, and a distribution chamber. The distribution chamber is vertically oriented and longitudinally-extending from the outlet of the cell. As the groundwater flows across charging plates of the cell, some of the molecules break into their component parts of hydrogen gas and oxygen gas. A selected vertical length of the chamber provides a resident time for the fluid allowing a majority of the gaseous oxygen to transition to dissolved oxygen.

22 Claims, 24 Drawing Sheets

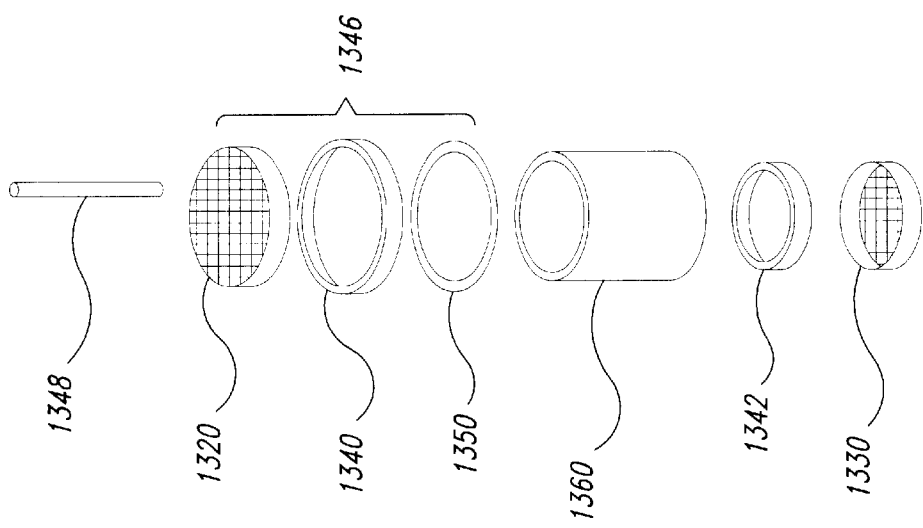
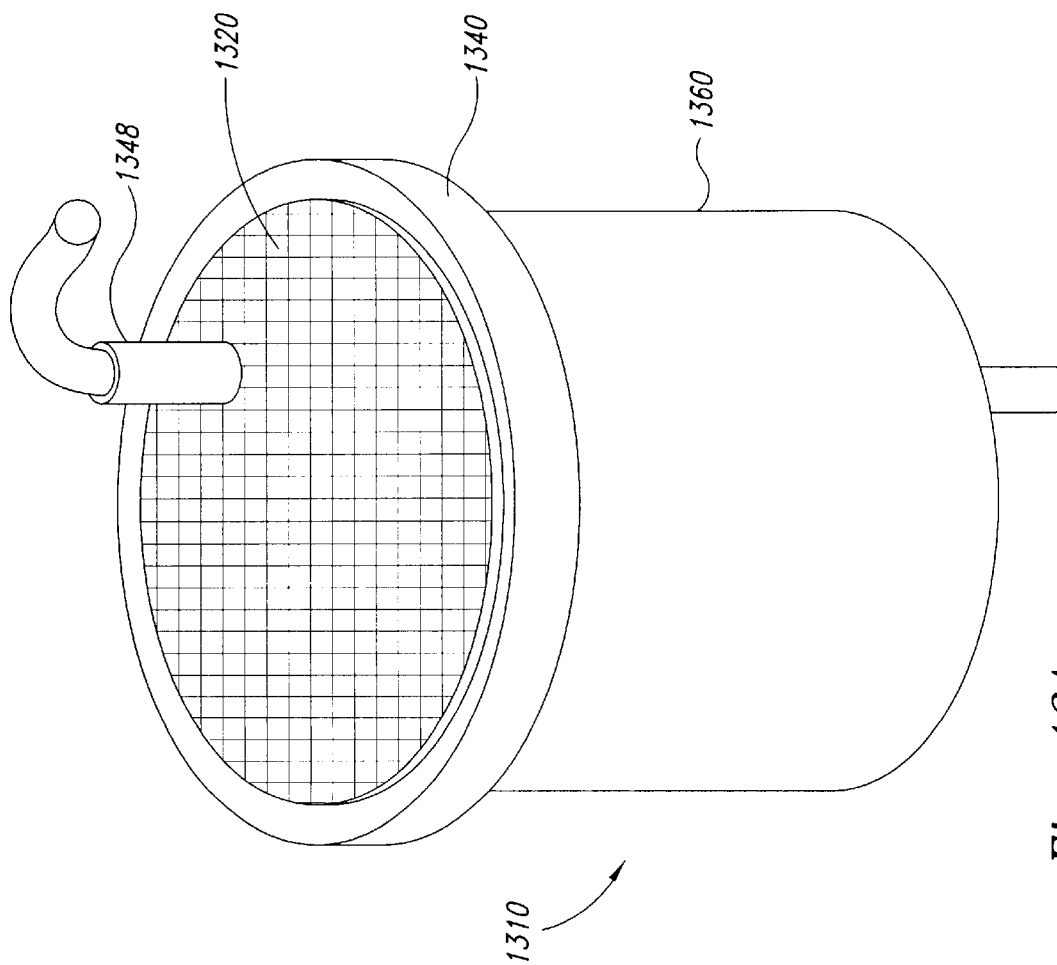

The Main Screen show three buttons, the first one it's described as:

* Beginning call Button
Begin the connection that corresponds with the Isogen Control.

Corresponding to the following screens.

Beginning Conecction

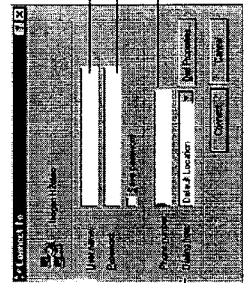

Registration Screen

→ User
→ User
→ Phone Number to Connect (Remote Isogen Control)

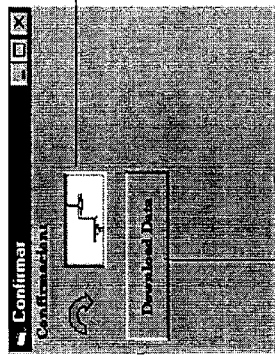

When you press this button, you can acces the data report.
Note: This Screen will be modify,Integrate to Main Screen.

Dial

Status of Connection

Verifying user name and Password with

*Fig. 26*

Verify Data

Second Button

ISO-GEN System Configuration            6/26/00

Serial Number     1000002

Last Download     3/10/00

Number of Cells in Operation     4

| System Configuration: | System #1 | System #2 | System #3 | System #4 |
|---|---|---|---|---|
| Cycle Time (Minutes) | 10 | 20 | 5 | 20 |
| Clean Time (Minutes) | 3 | 3 | 3 | 3 |
| Dwell Time (Minutes) | 240 | 120 | 240 | 120 |
| Polarity Reverse | Y | Y | N | Y |
| Cell Failure | N | N | Y | N |
| Pump Failure | N | Y | N | N |
| On - Off | On | Off | Off | On |

DECONTAMINATION METHOD AND SYSTEM, SUCH AS AN IN-SITU GROUNDWATER DECONTAMINATION SYSTEM, PRODUCING DISSOLVED OXYGEN AND REACTIVE INITIATORS

CROSS-REFERENCE TO RELATED APPLICATION

This application is a continuation-in-part of U.S. patent application Ser. No. 09/466,105, filed Dec. 17, 1999, herein incorporated in its entirety now U.S. Pat. No. 6,332,972.

TECHNICAL FIELD

This invention relates generally to decontamination systems, and more particularly, to apparatuses and methods for decontaminating in-situ groundwater by producing high amounts of dissolved oxygen and reactive initiators such as hydroxyl radicals.

BACKGROUND OF THE INVENTION

Much attention has been given to the preservation of our water supplies and resources, particularly since the mid 1960's. Agencies have become aware of the health effects of toxic pollutants on humans and the increased demands for potable water in this country and the world. Government agencies, for example, the Environmental Protection Agency (EPA), have responded by establishing maximum contaminant levels for many toxic chemical compounds. Today, once a chemical regulated under government law is identified in soil or water above the maximum contaminant level, facility operators or property owners are required to initiate assessment and remediation of the contamination. In some cases, the cost of cleaning up discharges of certain chemicals can greatly exceed the value of the contaminated property. In the past, the remediation of contaminated soil involved excavation and disposal of the impacted media. However, if the contaminant had reached the groundwater, the risk to the public welfare, remedial cost, and amount of time required to remove the contaminants increased substantially.

Biological treatment of water contaminants or organic chemicals with total petroleum hydrocarbons (TPH) and other contaminants has become an important process in controlling the pollution of the aquatic environment from industrial sources. The mineralization of organic chemicals depends on the nature of the chemical compounds involved. Some chemicals that find their way into the aquifer from industrial processes or natural processes resist degradation and are recalcitrant in nature; thereby accumulating in the environment.

It is well known that natural remediation occurs when facilitated by aerobic compounds in the soil. The injection of an oxygen release compound into the soil has been previously performed with a target of reducing the contaminants at a site. Some of these results are described in *The ORC Oracle Newsletter* 3:1, published by Regenesis.

This prior art method was a passive anaerobic biodegradation and was slow, incomplete and limited in its scope of impact. Since the system was passive, it was reliant on groundwater flow to distribute dissolved oxygen. Therefore, only groundwater downstream of the well was within the impacted area. Further, when the flow of groundwater was slow, the attenuation rate of the leached dissolved oxygen was correspondingly slow.

SUMMARY OF THE INVENTION

According to principles of the present invention, an apparatus is provided for increasing the quantity of dissolved oxygen in contaminated fluid. The apparatus includes a submersible pump for drawing the contaminated fluid across an electrolytic cell. The electrolytic cell includes a distribution chamber attached to an outlet of the cell. When the apparatus is immersed in the contaminated fluid and power is supplied to the pump and the cell, contaminated fluid enters through a pump intake, is pumped into a cell housing across the cell and exits out perforations in the distribution tube. Electricity flows through the fluid across charging plates of the cell, breaking some of the water molecules into their component parts of hydrogen gas and oxygen gas. At the outlet of the cell, both hydrogen gas and oxygen gas are present in the fluid. The distribution chamber is vertically oriented and longitudinally-extending from the outlet of the cell. The vertical length of the chamber is selected to provide a resident time for the fluid allowing a majority of the gaseous oxygen to transition to dissolved oxygen.

The apparatus can be used in-situ by placing the decontamination apparatus in a well below an elevation for the contaminated groundwater. When power is supplied to the system, the pump draws groundwater into the cell housing across the cell, while electricity flowing through the cell breaks some of the molecules into their component parts of hydrogen gas and oxygen gas. In some embodiments, it also generates reactive initiators to further remediate the contaminated groundwater.

BRIEF DESCRIPTION OF THE DRAWINGS

FIG. 13A is an isometric view of a support housing according to the principles of the present invention.

FIG. 13B is an exploded view of the support housing of FIG. 13A.

FIG. 26 is a flowchart further illustrating the screen view of FIG. 24 according to the principles of the present invention.

DETAILED DESCRIPTION OF THE INVENTION

A decontamination system, and in particular, an apparatus and a method for decontaminating in-situ groundwater by producing high amounts of dissolved oxygen and reactive initiators, such as hydroxyl radicals, is described in detail below. In the following description, numerous specific details are set forth, such as example environments, contaminants, configurations and material selection, etc., to provide an understanding of the invention. One skilled in the relevant art will readily recognize that the invention can be practiced without one or more of the specific details, or may be practiced to decontaminate other contaminants, materials, etc. Well-known structures or operations are not shown or described in detail to avoid obscuring aspects of the invention.

Figure 1:
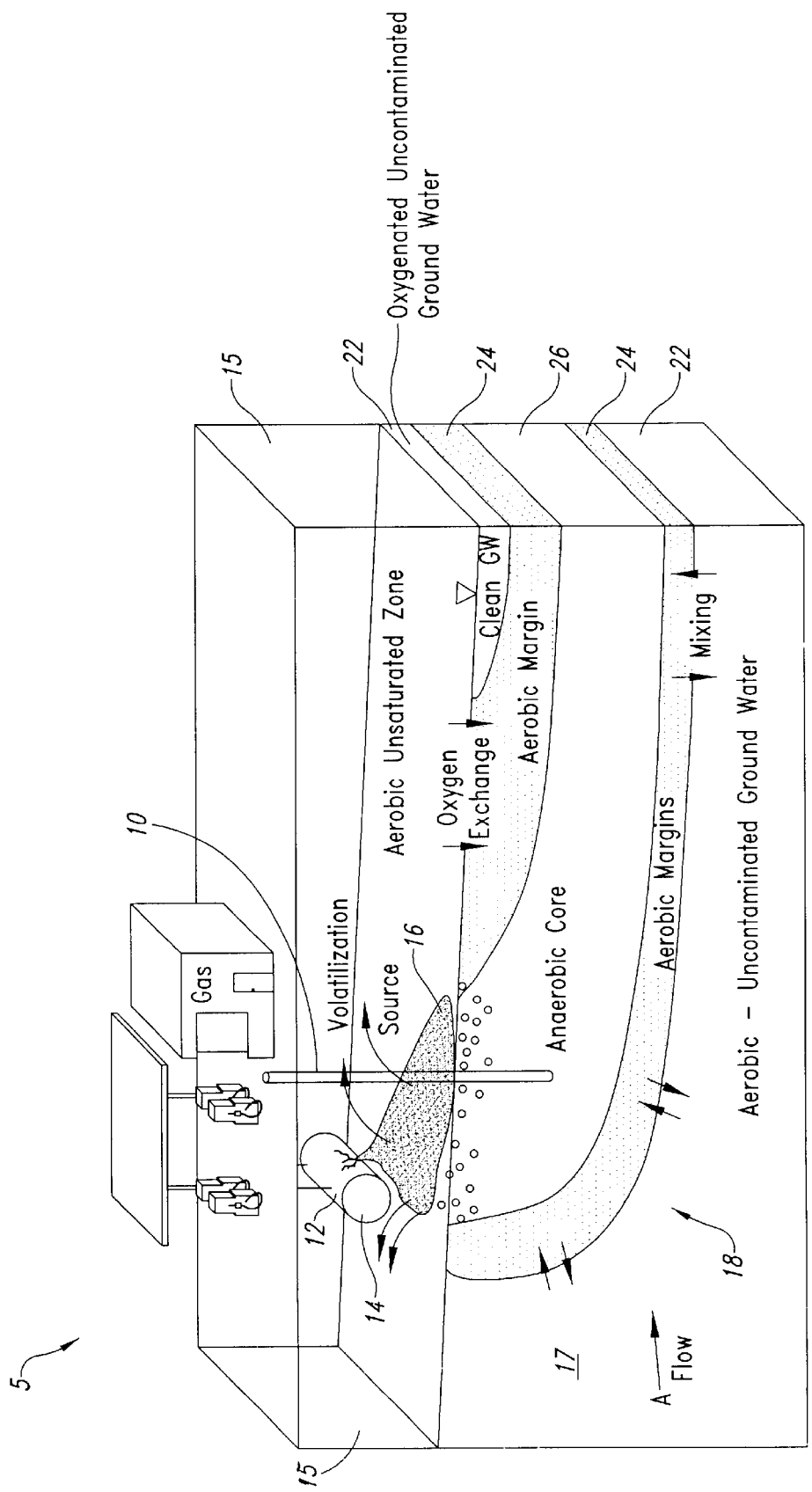
FIG. 1 is an isometric view of a contaminated groundwater site.
Figure 2:
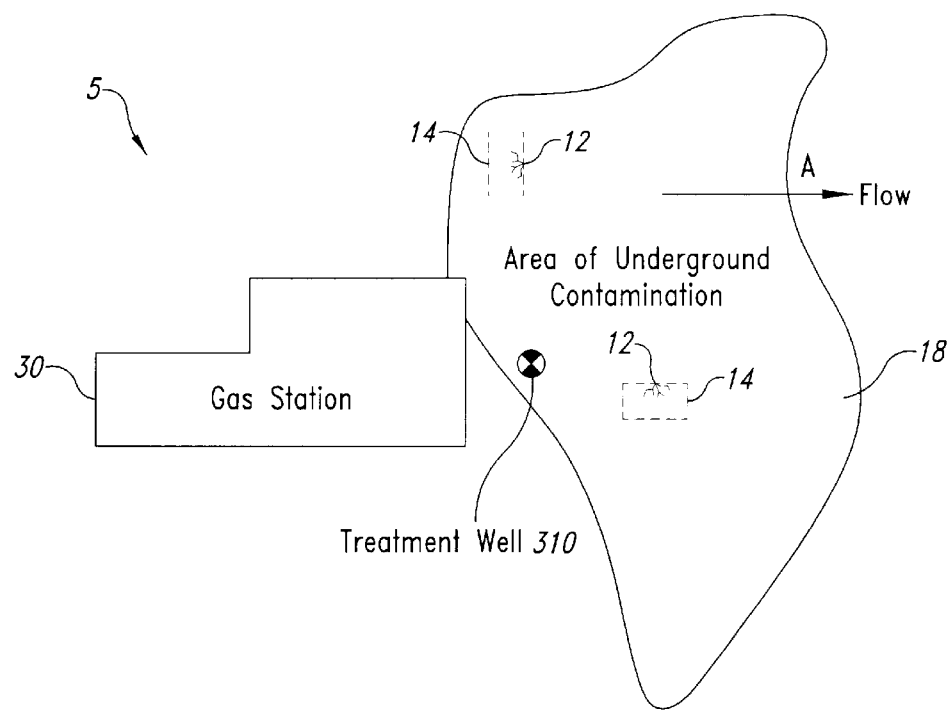
FIG. 2 is a plan view of a site, including a well with a decontamination apparatus therein according to the present invention.

FIGS. 1 and 2 illustrate a decontamination apparatus 10 placed in a contaminated environment 5. In this exemplary illustration, soil 15 and groundwater 17 may become contaminated when a holding tank 14 springs a leak 12, creating a contamination source 16. Alternatively, a surface spill may be the source 16 of the contamination 16 into the surrounding soil and groundwater. A natural flow of the groundwater is indicated in FIG. 1 by arrow A. The source 16 contaminates the groundwater 17 in a plume 18 of contaminant carried downstream. Uncontaminated groundwater 22 can exist at a point outside the impact area of the plume 18, creating an aerobic margin 24 along a perimeter of the plume 18. Mixing and natural bioremediation occurs in this aerobic margin 24 through an oxygen exchange with the uncontaminated groundwater 22. A center section of the plume 18 consists of an anaerobic contaminated core 26 of groundwater. In one embodiment of the present invention, the decontamination apparatus 10 is positioned within the anaerobic core 26 to facilitate bioremediation of the contaminated groundwater by increasing the quantity of dissolved oxygen and generating reactive initiators. In some sites, there may not be an identified anaerobic core and the decontamination apparatus is placed at a suitable location adjacent to or within the source 16 where it has affected the groundwater.

FIG. 2 illustrates a plan view of the exemplary contaminated environment 5 with a well having the decontamination apparatus 10 therein, located in an upstream location relative to the flow (indicated by arrow A). A gas station 30 may have more than one tank 14, each of which may have a leak 12 creating a plume 18 of contamination in the groundwater. The flow of groundwater may change the scope of the plume 18 and thus the location of one or more decontamination apparatuses 10 should be selected to take this into account.

Figure 3:
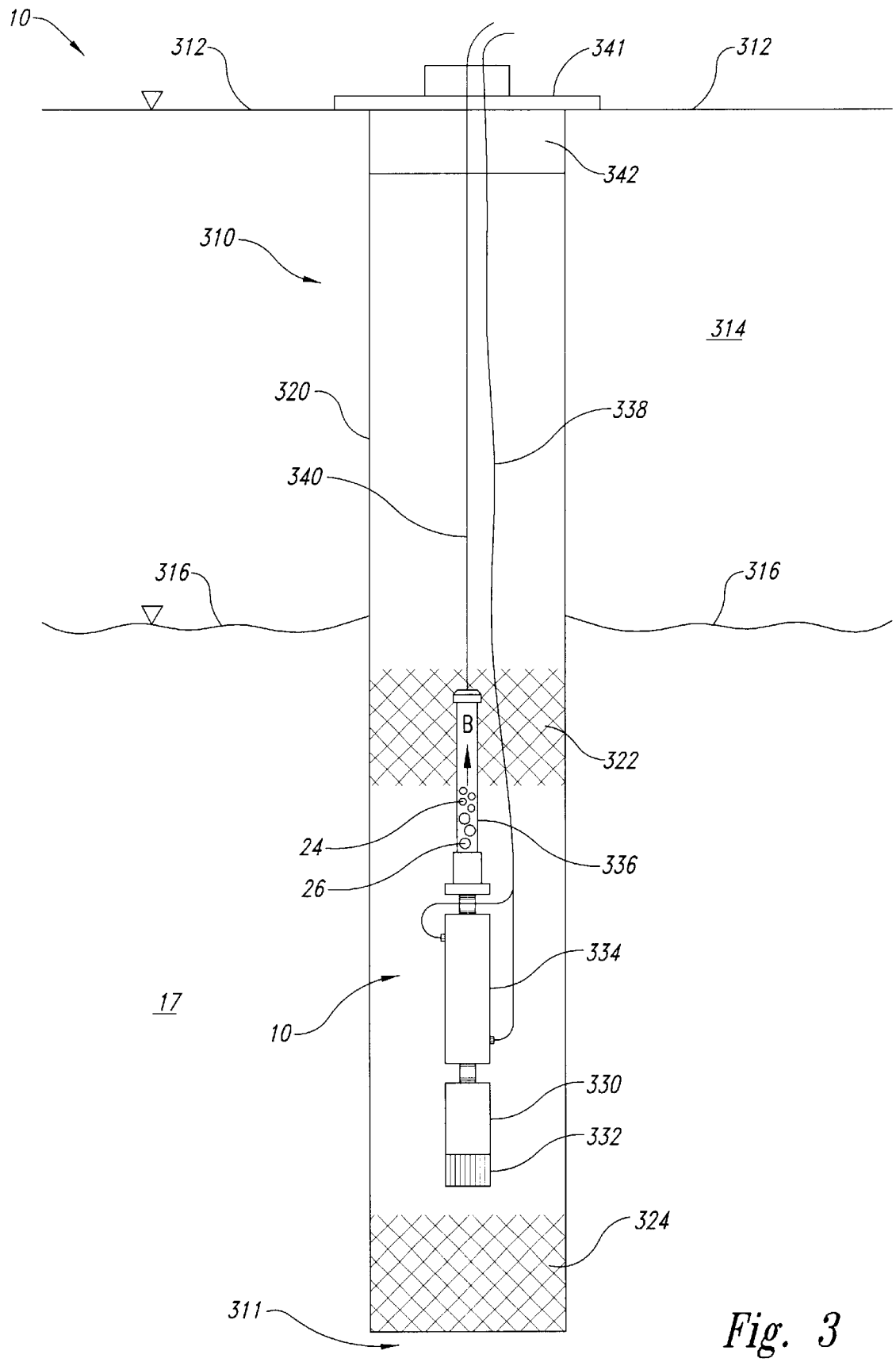
FIG. 3 is a cross section of the well of FIG. 2, with one embodiment of the decontamination apparatus therein, according to the principles of the present invention.

FIG. 3 illustrates one embodiment of the system in operation. In this embodiment, the decontamination apparatus 10 is lowered into the well 310 and submerged below an elevation of the contaminated groundwater. Solids are allowed to settle out under the decontamination apparatus 10, and therefore it is desirable that the decontamination apparatus 10 is suspended above a bottom elevation 311 of the well 310. Alternatively, the decontamination apparatus 10 can be placed in a lake, pond, tank or conduit containing contaminated fluid to be treated.

The well 310 extends from a ground level 312 of a soil 314 to below a water table elevation 316. Depending on the in-situ soil conditions, the well 310 can include a casing 320 to prevent the soil 314 from caving in. The casing 320 can include a well screen 322 at a lower elevation of the well 310 that allows groundwater to easily flow into and out of the casing 320 without undue clogging. An intake screen 324 may also be included at a bottom elevation of the casing 320 to further facilitate groundwater flow.

The decontamination apparatus 10 shown in FIG. 3 includes a submersible pump 330 with a pump intake 332, an electrolytic cell 334, a gas distribution chamber 336, power cords 338, support cable 340, and an apparatus support housing 341 including a gas absorption device 342. The pump 330 is positioned beneath and coupled to the electrolytic cell 334. The electrolytic cell is positioned beneath and coupled to the distribution chamber 336. The chamber 336 may be a tube having the same, or in some instances a larger or smaller diameter than the cell housing. The length of the chamber 336 may also be varied. In other embodiments, the distribution chamber may be other shapes, besides a tube. If a casing 320 is used, the gas distribution chamber 336 can be positioned adjacent to the well screen 322. The gas absorption device 342 is positioned at the top of the well 310 and is included within a support housing 341 that is capable of supporting the weight of the decontamination apparatus 10 within the well 310.

The pump 330 serves to draw fluid in through the pump intake 332 and through the electrolytic cell 334. One example of an acceptable submersible pump is a pump with a 3 gallon per minute (gpm) recirculation rate, 12 VDC input, 5 amp continuous current draw, 10 amp internal fuse, stainless steel impeller, rugged ABS outer housing and nitrile seals. It may be 6 inches in length and have an output coupling of a ½-inch hose connection for connecting the pump 330 to the electrolytic cell 334.

The pump 330 circulates the water 17 for decontamination treatment and cell cleaning. The pump 330 normally runs longer than the cell 334 during a treatment cycle, which allows fluid to travel across plates of the cell 334 without power applied to the cell plates. This helps to clean the cell plate of any deposits of calcium carbonate or magnesium carbonate that may have accumulated on the cell plates during treatment.

Figure 4:
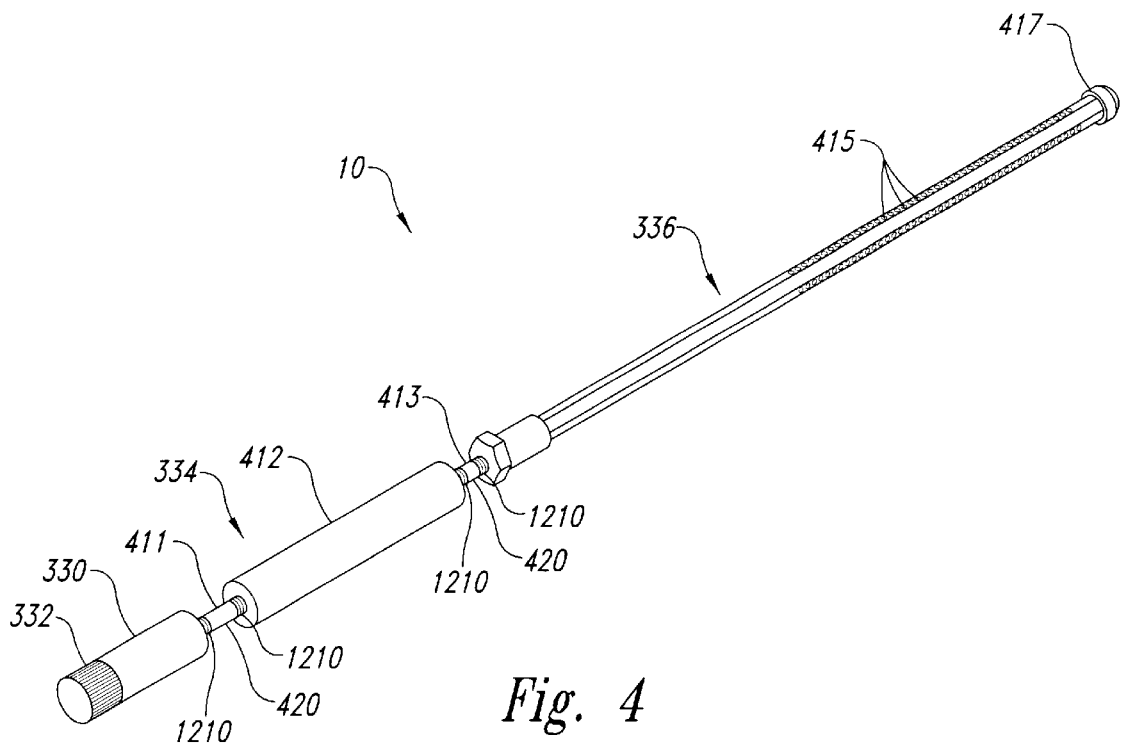
FIG. 4 is an isometric view of one embodiment of the decontamination apparatus according to the principles of the present invention.

FIG. 4 is one embodiment of the decontamination apparatus 10. It includes a pump 330, an electrolytic cell 334 in a housing 412 and a distribution chamber 336. A first coupling 411 connects the pump 330 to the cell 334 and a second coupling 413 connects the cell 334 to the distribution chamber 336. Each of the first and second couplings 411, 413 comprise a pair of barbed fittings 1210, each barbed fitting extending into an open end of a length of flexible tubing 420 that extends between the pair of barbed fittings. An interference fit is created between the barbed fittings and the flexible tubing. As a result, the decontamination apparatus 10 is flexible, allowing it to freely move through the contours of a well. The distribution chamber 336 is shown as a gas distribution tube in this embodiment although a variety of alternative shapes are acceptable. The chamber 336 may be a tube having the same, or in some instances a larger or smaller diameter than the cell housing. The length of the chamber 336 may also be varied. In other embodiments, the distribution chamber may be other shapes, besides a tube.

The distribution chamber or gas distribution tube 336 has a solid portion 410 and a plurality of perforations or small holes 415. The holes are of a size that permits the free flow of water into and out of the tube 336 while still providing a guideway for oxygen or hydrogen that may remain in the gas phase. The holes 415 may be in the range of ⅛ to ½-inch in diameter and in a preferred embodiment, are ¼ inch in diameter. A cap 417 on the tube 336 ensures that all treated water is forced out of the tube 336 through holes 415. Usually, the solid portion 410 will be about half the length of the tube 336 and the perforation 415 extends for about the other half.

Figure 5:
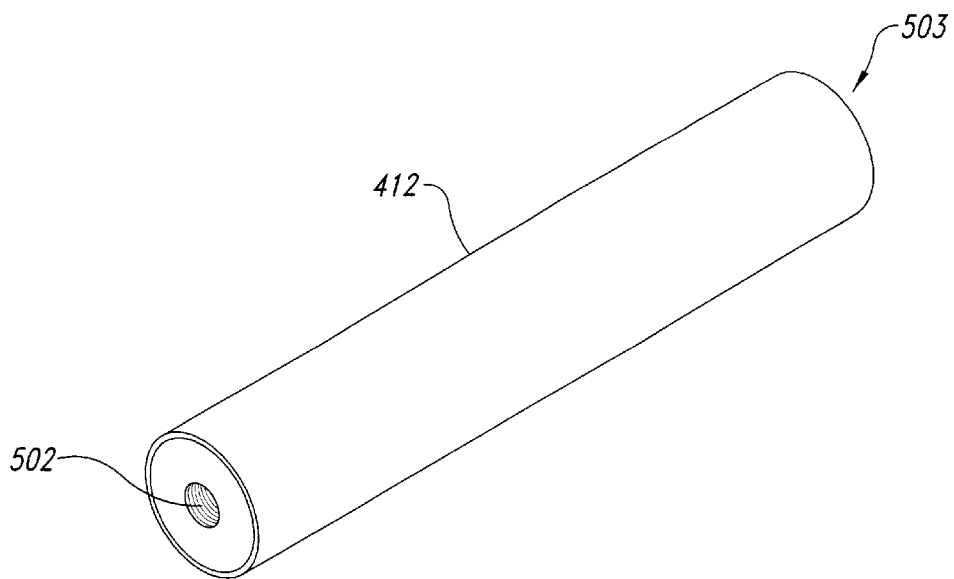
FIG. 5 is an enlarged view of the electrolytic cell plate assembly housing shown in FIG. 4 according to the principles of the present invention.
Figure 6:
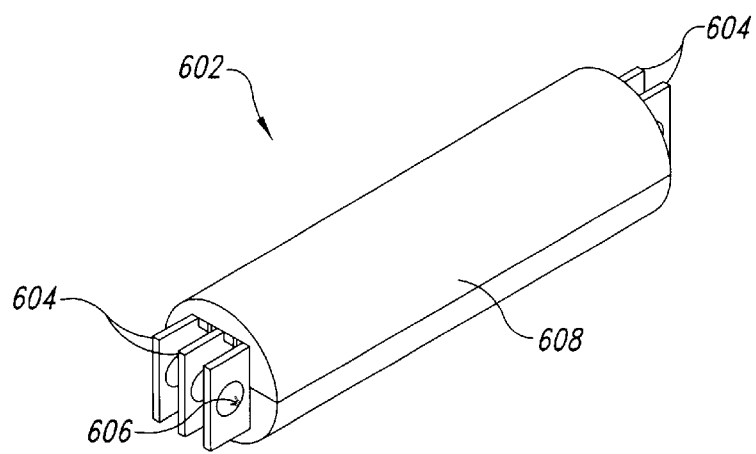
FIG. 6 is an isometric view of the electrolytic plate assembly of the embodiment shown in FIG. 4 according to the principles of the present invention.

FIG. 5 is an enlarged view of the housing 412 in which the electrolytic cell 334 of FIG. 2 is positioned. A threaded inlet 502 is provided at one end for permitting easy attachment of coupling 411 for the liquid to freely enter. An outlet 503 provided at the other end of the housing is also threaded on its internal surface for connection to coupling 413. FIG. 6 illustrates the electrolytic cell plate assembly 602 housed within the housing of FIG. 5. In the exemplary embodiment, the housing 412 of the electrolytic cell 334 and tube 336 are constructed from an appropriate plastic selected for a particular application. A diameter of ½" can be sufficient, but for certain applications, the diameter may be 1", 2", 3" or larger.

As shown in FIG. 6, electrolytic cell plate electrodes 604 are contained within a cell plate housing 608. The cell plate housing 608 may be constructed of the same material as the cell housing 412. The electrodes 604 of the electrolytic cell are appropriately connected to the positive and negative power supplies, as is known in the art. The length and the number of the electrodes 604 is selected so as to provide the desired amount of oxygen generation, again according to known principles.

Figure 7:
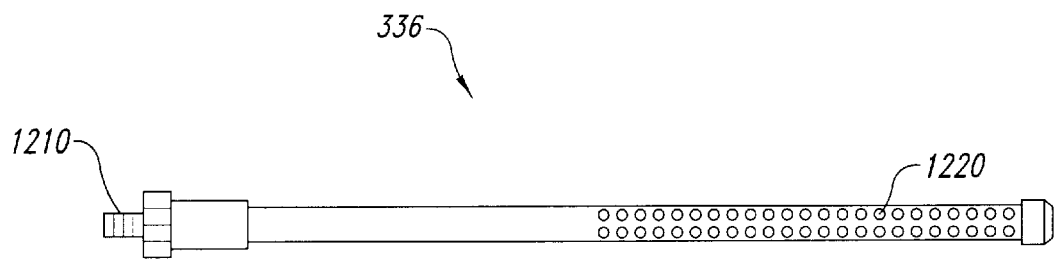
FIG. 7 is a side view of the gas distribution tube of the embodiment of FIG. 4.

According to one embodiment of the present invention, and as shown in FIG. 7, the gas distribution tube 336 is a straight, longitudinally-extending tube with an unrestricted cross-sectional area. One end of the gas distribution tube 336 includes a coupling 413 having barbs 1210 for connecting to a barbed fitting on the electrolytic cell housing 412 via a length of flexible tubing as described above. At an opposite end of the gas distribution tube 336, perforations 1220 allow the treated water to exit. The unrestricted cross-sectional area permits water to pass therethrough in laminar flow without encountering obstructions. This provides a quiet zone, which permits the oxygen molecules to more easily be dissolved into the water. If the gas distribution tube 336 is made too short, the housing will terminate before a majority of the oxygen has dissolved into the water and will thus be exposed to surface air and exit in the gaseous form, rather than becoming dissolved in the water. Further, if turbulence is induced in the water, such as by having a sharp turn, a 90° elbow or other obstructions immediately after the cell before sufficient quiet time has been permitted, then the oxygen and hydrogen will be inclined to remain in the gaseous state and not transition to dissolved oxygen.

As shown in FIG. 3, the gas distribution chamber is designed to deliver the gaseous mixture directly into the well screen, enhancing transfer into the aquifer. The gas distribution chamber of the present embodiment is constructed from ½-inch PVC and has a ½-inch PVC barb fitting attached to it. The barbed fitting allows the gas chamber 336 to be attached to a barbed fitting of the cell via flexible tubing, thereby creating a flexible joint. Gas distribution tubes can be in any length with varying perforations to fit the well application best. The standard unit is 3 feet in length with 18 inches of ¼-inch perforations.

Figure 8:
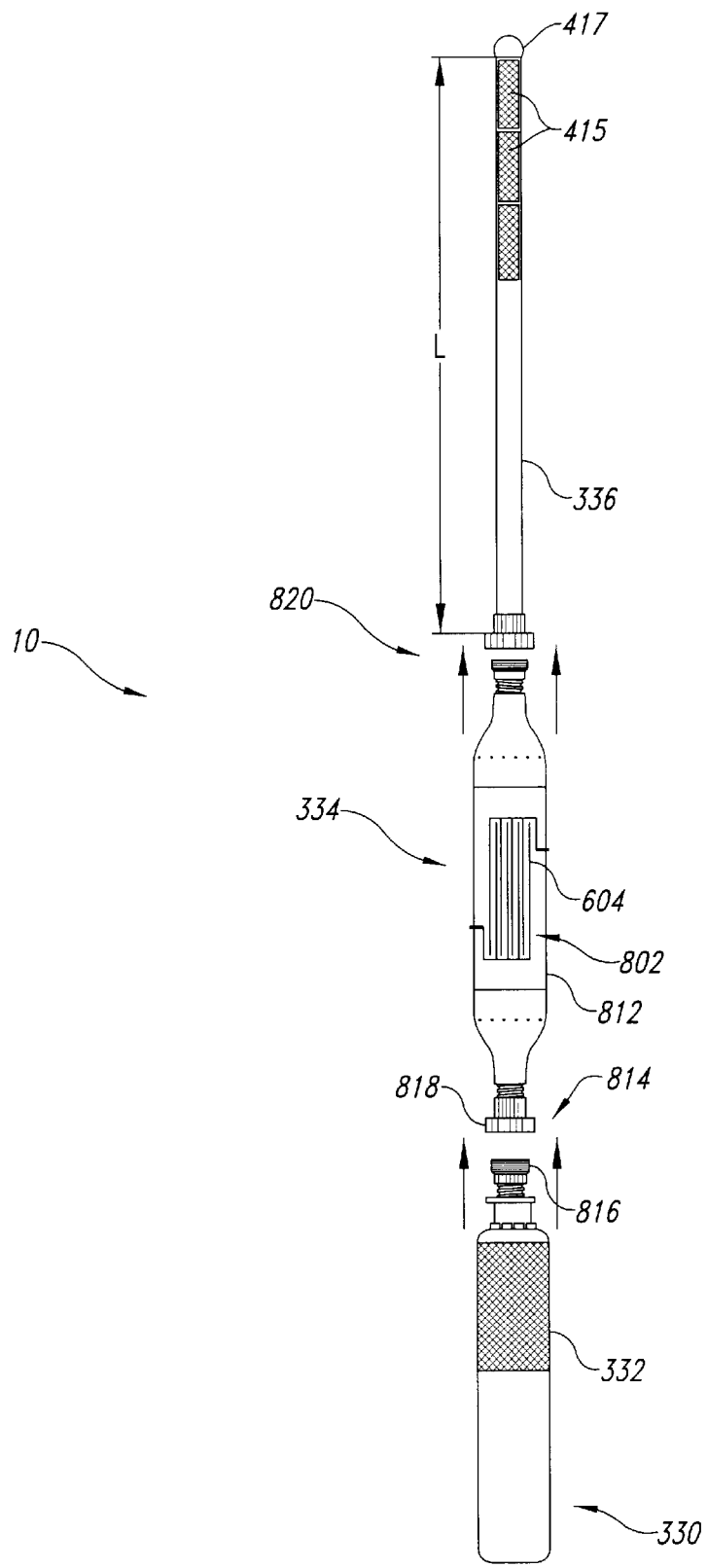
FIG. 8 is an exploded view of another embodiment of the decontamination apparatus according to the principles of the present invention.

As will be appreciated, the optimum length L, as illustrated in FIG. 8, is related to the flow rate desired, as well as the diameter of the tube 336 and other factors. For a very low flow rate, a shorter length L is acceptable because the water will have sufficient resident time such that a majority of the oxygen can transition into dissolved oxygen. On the other hand, for higher flow rates, a longer length L will be desired. Alternatively, the diameter of the tube 336 may be made larger than the diameter of the cell, providing a slower flow rate and longer resident time for the same volume of flow rate.

FIG. 8 shows yet another configuration for the decontamination apparatus 10 with the housing 812 of the cell cut away to reveal the cell assembly 802 configuration within. In one embodiment, the housing 812 has the same cross-sectional diameter as the gas distribution tube 336 so as to provide a generally smooth, laminar transition from the electrolytic cell 334 to the gas distribution chamber 336, Generally, the gas distribution chamber 336 will begin immediately above the electrolytic cell 334 so that the generated oxygen gas can begin to transition into the dissolved state. In an alternative embodiment, the gas distribution chamber 336 has a larger diameter than the cell housing 812 to provide an extended resident time for a given flow rate.

The electrolytic cell 334 in the exemplary embodiment is connected to the pump 330 via a union coupling 814 at one end of the housing of the cell. A male coupling 816 is positioned at a top portion of the pump and a corresponding female coupling 818 is positioned at a bottom portion of the cell is housing. A similar coupling 820 is provided at the top of the cell 334 for connection to the distribution chamber 336. The coupling connection 814 is a significant advantage in providing service and cleaning of the electrolytic cell 334 and the housing 812. When it is desired to service the electrolytic cell 334, such as cleaning the electrodes 604, replacing or servicing any of the components or the like, operation of the system is terminated and the decontamination apparatus is removed from the well. Water is drained from the apparatus. The couplings are then rotated so as to separate the electrolytic cell from the rest of the system. The cell housing is thereafter removed from the system for replacement, servicing or the like if desired. Thereafter, the cell housing, having the new electrolytic cell or the cleaned cell therein is replaced and the couplings are reattached so the system becomes fully operational. The couplings can be any acceptable coupling in the prior art, including rotatable threads, watertight couplings or the like, many such watertight connections being known.

Figure 9:
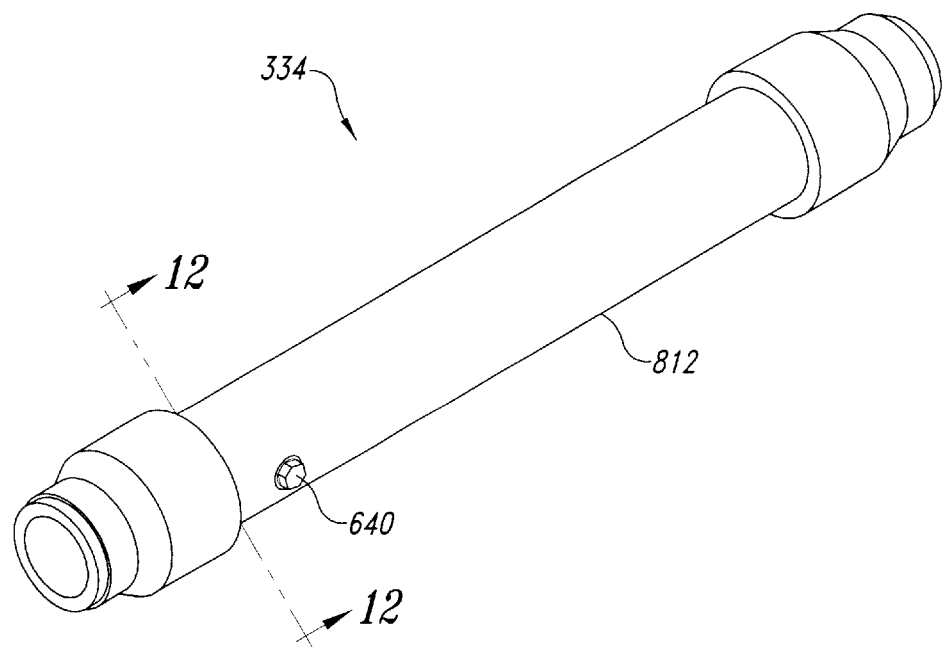
FIG. 9 is an enlarged isometric view of one embodiment of a housing for the cell of FIG. 8 according to the principles of the present invention.
Figure 10:
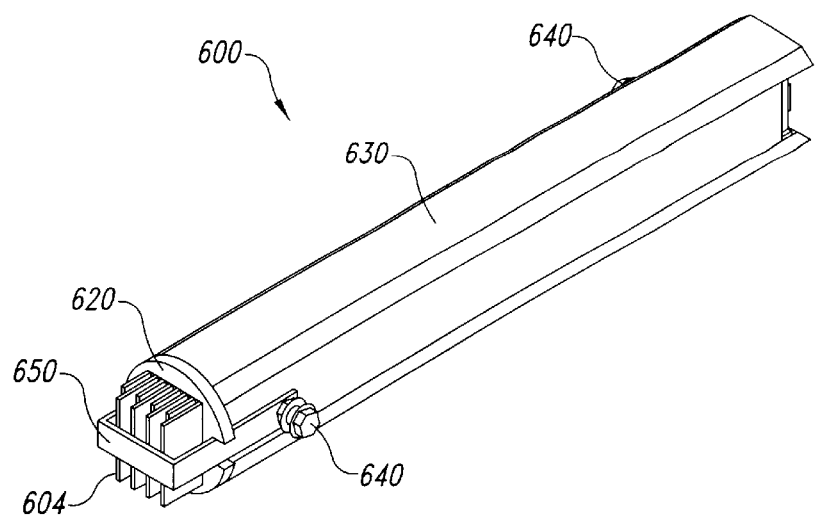
FIG. 10 is an enlarged view of one embodiment of an electrolytic plate assembly for use in the housing shown in FIG. 9 according to the principles of the present invention.
Figure 11:
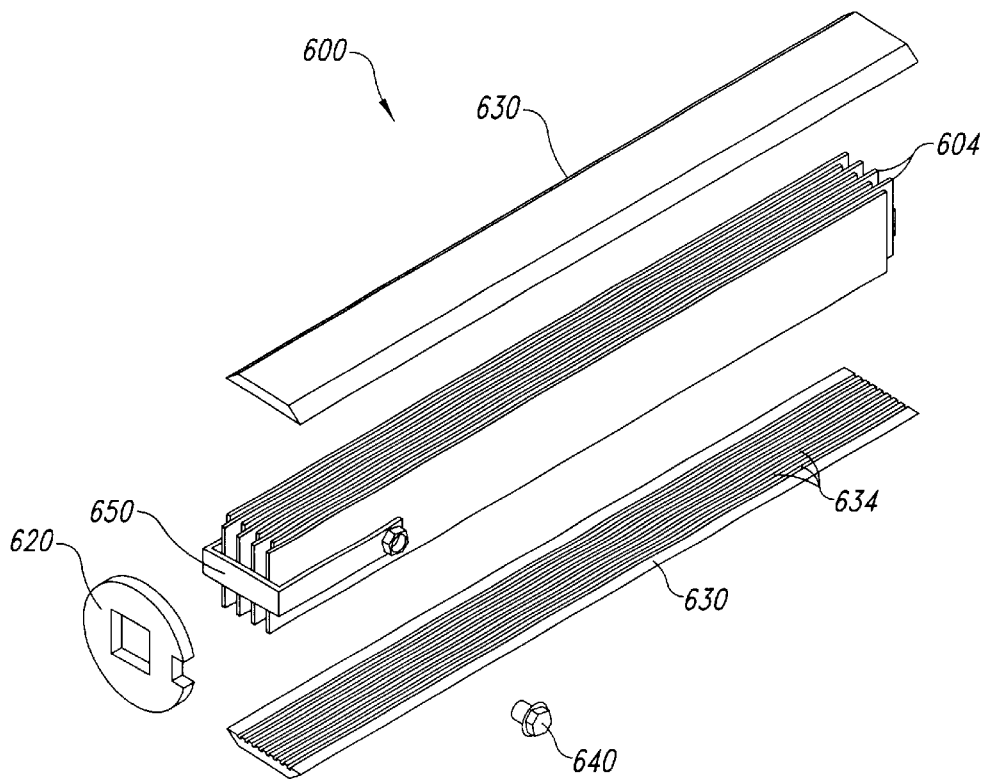
FIG. 11 is an exploded view of one embodiment of the electrolytic plate assembly shown in FIG. 10 according to the principles of the present invention.

In one embodiment of the electrolytic plate assembly 600 shown in FIGS. 9, 10 and 11, electrode plates 604 include anodes and cathodes. The anodes and cathodes can be coated in a double sided material selected from the group comprising noble and transitional metals, for example, EC-400, nickel, platinum, double-sided tin or stainless steel. In one exemplary embodiment, spacing between the charging plates is approximately 0.030–0.250 inch, and more particularly, 0.08 inch. Plate dimensions are 1 inch by 6 inches, although plate size may vary. Plate configuration can be 4 to 12 electrode plates, such as an 8 electrode plate configuration shown in FIG. 10 or a 5 electrode plate configuration shown in FIG. 6. The grooves 634 hold the electrode plates 604 a preset distance apart from each other at all times.

Figure 12:
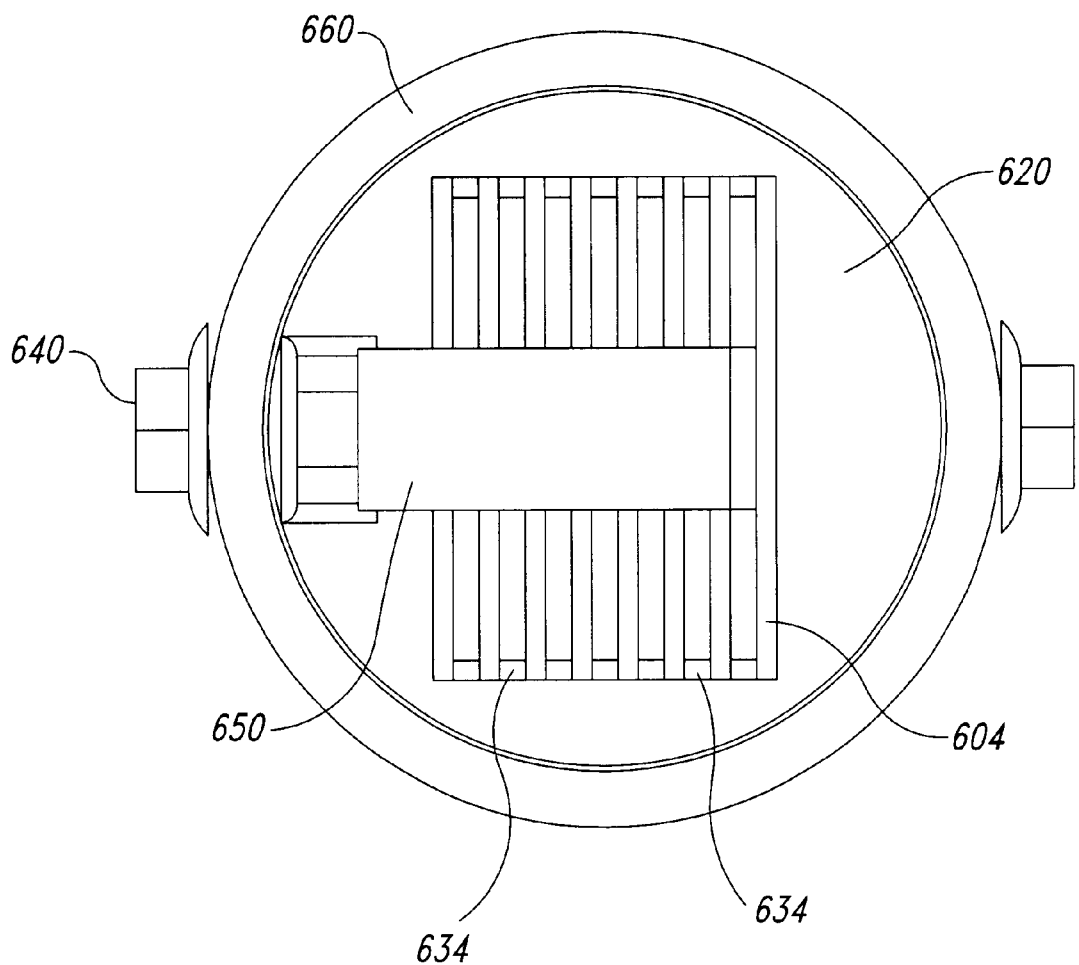
FIG. 12 is an end view of one embodiment of the housing and cell taken along the line 12—12 shown at FIG. 9 according to the principles of the present invention.

In one embodiment and as shown in FIGS. 10, 11, and 12, the electrode plate assembly 600 further includes a water block 620 at a top and a bottom end of the electrode plates 604. A grooved plate rail 630 sandwiches an upper and lower side of the plates 604 wherein an edge of one charging plate 604 extends into the grooves 634 of the plate rail 630. A titanium bolt 640 connects to L-shaped bracket 650 at each end of the plates 604. The bracket 650 in the illustrated embodiment is shown welded to the charging plates. Alternatively, the electrolytic cell may be bolted together as shown in FIG. 6. The bolts 640 provide an electric connection to the charging plate 604 to conduct power to the cell 334 for electrolysis to occur and extends through to the outside of the housing 812 (shown in FIG. 9) of the cell 334.

During operation, the electrolytic cell has direct current power supplied thereto so as to provide a flow of electric current through the liquid flowing therein. The passage of electric current causes some of the molecules to split into their component parts creating hydrogen gas and oxygen gas. If the liquid includes water, some of the water molecules will split apart. If other fluids or molecules are in the cell, some of them may also be split apart, depending on the energy level and chemical bonds. For example, if chlorine compounds or molecules are in the fluid, some of them will be split. Also, other compounds, including hydrocarbons of various types, may have one or more atoms split from the molecule or the entire molecule split apart when subjected to the energy of electricity passing from one plate to another.

Since the type and number of fluids and molecules in the fluid may vary greatly from site to site, it is not needed to describe all the possible compounds and atoms that may be split or created by energizing the cell. It is sufficient to state that many molecules in the fluid will be affected and altered by the energy of passing on electric current between the plates with the fluid present. As shown in FIG. 3, at the outlet of the electrolytic cell, the hydrogen gas, represented by the large bubbles 26 and the oxygen gas, represented by the small bubbles 24, exit from the electrolytic cell. Both the hydrogen gas 26 and the oxygen gas 24 are, at this time, mainly in the gaseous state. Hydrogen bubbles 26 are generally larger and more likely to remain separated from the water itself. Oxygen bubbles, on the other hand, are quite numerous and create a cloud effect immediately at the exit of the electrolytic cell 334. Both the hydrogen and oxygen, at this stage being in gaseous form, begin to rise in the water. In addition, the water is usually moving through the tube as shown by direction arrow B in FIG. 3. In some embodiments, the water may be stationary and even in those embodiments, the gases will still rise slowly through the tube, the gas being lighter than the water.

As the oxygen 24 rises through the gas distribution tube 336 it will transition from a gaseous state to a dissolved state, greatly reducing the number of separate oxygen gas molecules therein. The length L is selected to be sufficiently long that a majority of the oxygen molecules become dissolved oxygen in the water, see FIG. 7. Many of the hydrogen molecules will react with substances in the contaminated groundwater to neutralize or inhibit the effects of the contaminants. On the other hand, some of the hydrogen molecules are more likely to retain in the gaseous state through the entire length of the tube and thus will remain in the gaseous form as shown by bubbles 26.

According to principles of the present invention, the decontamination apparatus 10 is composed in such a way that it can be easily assembled and disassembled, particularly in the field. For example, the various units including the pump, the housing, and the gas distribution chamber are connected with easily releasable fittings or fasteners such that a user can disassemble it. It also includes easy-to-assembly connectors such that a user can quickly assemble it in the field or perform a reassembly after the cleaning. For example, the coupling between the pump 330 and the housing for the electrolytic cell 334 is preferably an easy-release and easy-assemble-type coupling. An example of this type of coupling includes threaded union, snap-on clamp, rubber gasket seals or other couplings that can easily be assembled and disassembled. In the embodiment shown in FIGS. 4–7, the coupling is a threaded coupling using standard threaded fittings between the pump, the housing, and the gas distribution chamber. In the embodiment of FIGS. 8–12, the couplings and connections include various unions and gaskets which are rotatable with respect to each other such that both units can be held stationary while being connected to each other. Other acceptable, and equivalent, coupling techniques can be used so as to provide easy disassembly in the field for cleaning and maintenance, and also permitting easy assembly and reassembly so the unit may be put back into service by a general worker that does not require special skills or training in this particular technical field. Further, it can be reassembled and put back into service in a very short period of time following such disassembly for cleaning.

FIG. 13A illustrates a top support housing 1300 having a gas absorption cap 1310. FIG. 13B illustrates an exploded view of the housing 1300 and gas absorption cap 1310 of FIG. 13A. The support housing 1300 can provide support for the suspended decontamination system 10 positioned in the treatment well 310. The gas absorption cap 1310 includes a PVC mesh screen 1320 at an upper end and a PVC mesh screen 1330 at a lower end. The mesh screens 1320 and 1330 are held in place with PVC rings 1340, 1342 and a "O" ring 1350. A PVC shoulder 1340 supports the mesh screen assembly 1320 and coupler 1360 extending into the well 310. The coupler 1360 is filled with a gas and/or water absorbing compound, such as charcoal. The housing 1300 and gas absorption cap 1310 are designed to hold the weight of the decontamination system and to filter any free gasses that do not enter the aquifier. The coupler 1360 is refillable with an absorbent compound. In one exemplary embodiment, the cap may be 2 to 4 inches in height. The cap includes a penetration tube 1348 to allow the support cables and power cords for the decontamination system to extend therethrough.

Figure 14:
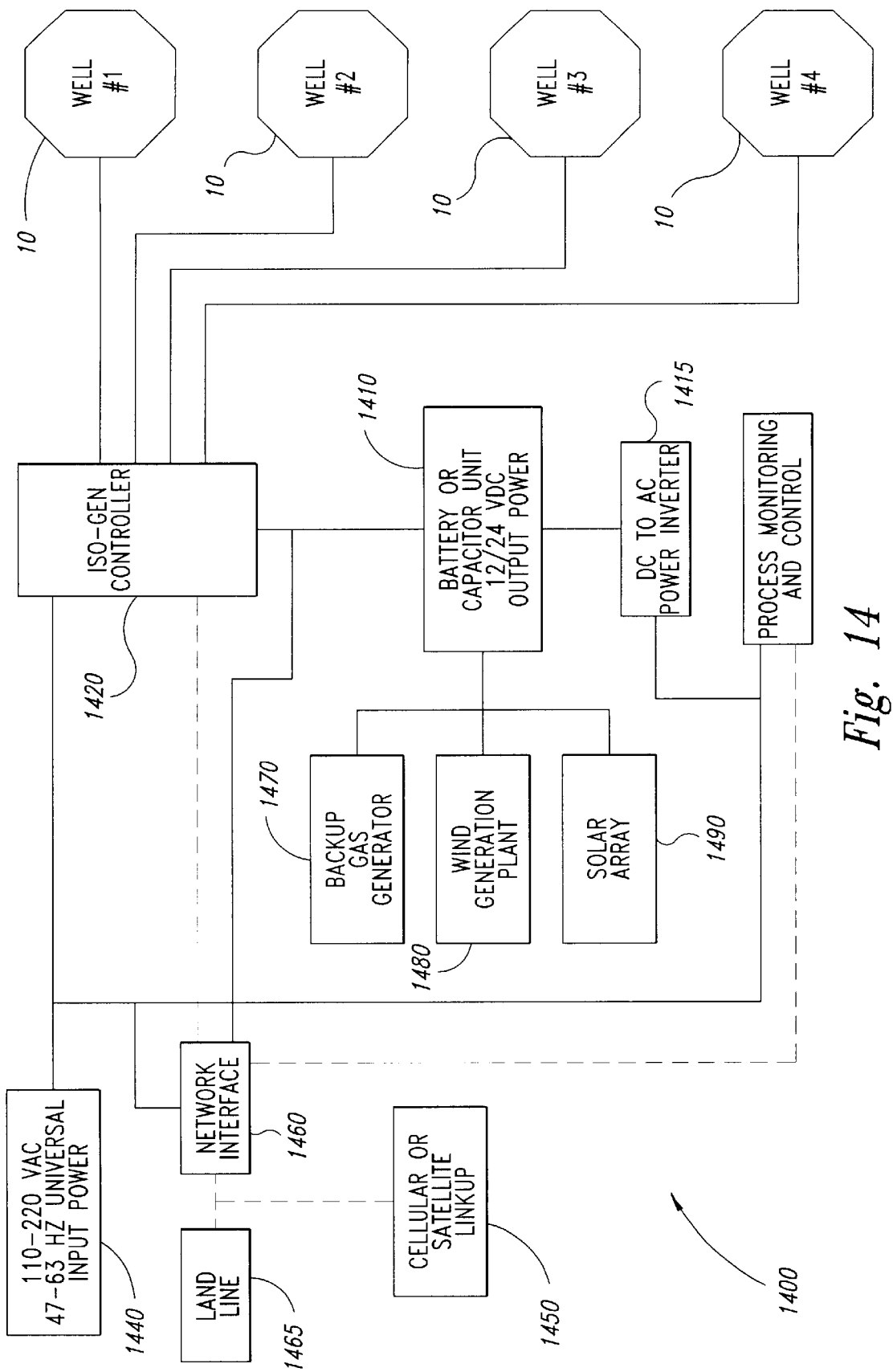
FIG. 14 is a schematic diagram of the decontamination system in accordance to the principles of the present invention.

FIG. 14 illustrates a schematic diagram of one embodiment in which power is supplied to a system 1400 via a battery or capacitor unit 1410 including a DC to AC power converter unit 1415 to generate a DC output of the proper voltage and current values. Amperage should be user adjustable. The power supply unit 1420 can power up to 4 electrolytic cells and pumps 10, though only one cell (pump) 10 typically operates at any one given time. Drive to the cell and pump 10 is initiated by internal timing of a controller unit 1420.

The controller unit 1420 should also include a circuit for reverse polarity in the cell 10 output for each treatment cycle. When a treatment cycle starts, it should operate in an opposite polarity from the previous treatment cycle to clean or de-scale the cell plates. Varying hardness of water and different fluids may cause build-up on the plates, including calcium carbonate and magnesium carbonate. For this reason, periodic inspection and cleaning with vinegar or a 50/50 mix of muriatic acid and water may be necessary.

The controller unit 1420 will supply power to the cell for 10 minutes on every hour, this timing feature should be adjustable up to 30 minutes at 5 minute increments. Adjustment can be jumpers, dip switches or another means mounted to a board or otherwise connected to the controller unit 1420.

The controller unit 1420 also operates a DC submersible pump. The pump runs 5 amps @ 12 volts. The controller unit 1420 further includes a dual speed pump circuit. This allows the cell and pump 10 to operate simultaneously, and then, after the cell is powered down at the end of a treatment cycle, the pump should continue to run for an additional period of time. Although this period may vary, in an preferred embodiment it is 3 minutes. During this clean cycle, the fluid travels across the plate faster than when magnesium or calcium deposits formed on the plates. Preferably, the flushing speed of the pumped water is twice the speed as when water is being pumped to the cell. Pump amperage is electronically monitored and if the pump fails then the controller unit 1420 illuminates a red LED (not shown) to indicate a bad pump.

The system monitors the cell for at least 2 failure conditions. The first failure condition is an amp overcurrent, at which time the cell should be turned off. The second failure condition is an amp undercurrent, which indicates a worn out cell. Both of these conditions should illuminate the red LED. In some embodiments, the overcurrent condition will be in the range of 5 to 10 amps and the undercurrent condition be in the range of 0.5 to 1 amp, though both these ranges may vary depending on the site, the type of fluid and cell configuration.

The failure of the first type can be characterized as failure for the current actually provided to the cell not reaching the value as directed by the controller. For example, for given flow rate, the electronic controller will output a desired current density to be achieved at the electrolytic cell. The voltage is then increased, or decreased to the value needed to achieve this current density. As the voltage changes, the actual current provided to the electrolytic cells is sensed so as to get an accurate measure of the current flow for a given voltage. If the voltage reaches a maximum value, but the current is still so low as to not be within the range called for by the flow rate, then a first failure mode is indicated and stored in the memory. It will thereafter be downloaded via the communications connector as described elsewhere herein. Alternatively, in the event the current becomes excessive for a given voltage, this will also be seen as a failure mode which is stored and monitored. For example, if the flow rate calls for a selected current and the voltage begins to increase to achieve such a current but which results in the current reaching its maximum value, then this would indicate a failure mode because the current has exceeded an acceptable maximum value. As will be appreciated, the overcurrent value can be sent at any other level as desired for each given application. Such a high current rate may indicate such factors as debris across the plates shorting them together creating a low resistance, high current path, some other malfunction in the system or other short circuit. Similarly, an inability to reach the desired current for a voltage range may indicate that the resistance of the water is at some unacceptably high level, that scaling has built up on the plates so as to increase the resistance to the current flow from one plate to another or some other factors. By monitoring the two types of failure modes, in one embodiment, the electronic controller is able to confirm that the system is operational within acceptable perimeters at all times and, in the event it becomes non-operational can transfer a signal immediately via the communications connector as well as illuminate check system light.

In accordance with one embodiment, the controller unit 1420 should try to restart the failed system 1400 for a predetermined number of operating cycles, for example, for 12 operating cycles, after 12 operating cycles a permanent failure will be indicated. An input power supply 1440 should operate on either 110 or 220 VAC power at 47 to 63 hz and should carry UL-CSA (etc) approval for sale domestically and internationally.

The control unit may further include two serial ports for future peripheral expansion. This will allow the user to later add in additional features such as a dissolved oxygen meter, a PH meter, a conductivity meter, an oxygen reduction potential meter, etc.

For example, according to one alternative embodiment, a dissolved oxygen meter is provided in the gas distribution chamber, or other suitable location after the electrocatalytic cell. The dissolved oxygen meter senses the actual value of the dissolved oxygen and provides an electronic signal which is output to the controller. The controller stores this value of the dissolved oxygen as empirical data. For those embodiments in which a dissolved oxygen meter is provided, this signal may be used as a feedback signal to the power supply to the electrolytic cell. In the event the dissolved oxygen is higher than the desired value, the power can be reduced go as to save power in achieving the desired value. Alternatively, if the dissolved oxygen is below the desired value, the power can be increased so as to increase the dissolved oxygen to the desired level. Since the cost, and difficulty of installing dissolved oxygen meters is quite high, they will not be used in all embodiments, nevertheless it may be desirable in certain installations to provide a dissolved oxygen meter and provide the feedback monitoring as has been described herein. Other meters, such as a PH meter, a conductivity meter, or other types of sensors providing electronic output may also be provided and have their outputs provided to the controller. The data may therefore be collected and used to modify the power provided to the electrolytic cell or other perimeters in the performance of the system. All such collected data will, of course, be time correlated and stored in the manner described with respect to the current, voltage and flow rate as detailed elsewhere herein.

Power to the cell and pump 10 should require no additional external cabling beyond the power cords 338 shown in FIG. 3. However, provisions should be made to connect the power cord to an external power supply. Normally, a standard 220 volt or 115 volt supply will be acceptable. Cell and pump 10 will utilize four-conductor power cord 338, the gage of which will vary with the length of the wire run. Enclosure must be Nema 4 (or 4x) rated standards and can either be metal or fiberglass and can be wall mounted. Fiberglass is preferred. The controller unit 1420 further includes a fan to extract internal heat and prevent heat buildup. All cabling in and out of the enclosure should be hardwired within conduits, and should be installed by an electrician.

A yellow "power ON" light is mounted on the front of an enclosure for the controller unit 1420, near the main power on switch—to indicate main power on. Three red/green LEDS should be mounted to the enclosure front indicating which of the three systems is operating. The green will indicate system is on, a steady red LED will indicate if a pump has failed. A flashing red LED will indicate overcurrent to cell or cell failure depending on the pattern of flash. Cables penetrate the controller enclosure through the bottom. It is preferred to build these electronics into a Class 1 Div. 1 explosion proof enclosure.

In accordance with one embodiment of the present invention, if the cell tries to draw more excessive current or registers a dead short then the cell is powered down, and the pump alone will circulate for the remainder of the treatment cycle. An external indicator for a cell fault will be activated continuously. When a cell fault occurs at a well, the controller unit 1420 or operator will automatically begin operation at the next cell in the bank. The controller unit 1420 will test the fault cell again each time the fault cell's turn comes up in the operation order. If the fault cell begins to operate normally then it is allowed to rejoin the normal operation order. Further, if the controller unit 1420 is applying the maximum available voltage to the cell sufficient current is not attained then the controller unit 1420 should indicate Cell Undercurrent while allowing operation at the cell. The controller unit 1420 should power down the cell if it drops below some minimum threshold and the maximum voltage is being applied to the cell. Additionally, if the pump draws too much or too little current, then it is a fault and the pump should be shut down and activate an external indicator. The cell voltage will normally ramp up from 0 to its normal operating voltage and current to maintain operation.

The control unit may include a soft start circuit and a soft power change circuit. The soft start circuit allows current to ramp up from its initial "off" condition to the specified value period of several seconds to provide even current dispersion across the electrode plates. The soft start circuit operates as follows. When the control unit activates the cell to begin passing current between the plates and through the water, an initial turn-on signal is generated. Indicator light indicating that cell is active is illuminated. A ramp is established starting at zero and having a desired slope. The power will increase gradually and will be stable at the desired amperage level after a certain period of time. The rate at which it will slowly approach the final current value can be selected as desired, preferably over the range of three to ten seconds and, in one embodiment is about five seconds. The current provided to the cell will slowly increase from zero towards this final value at a consistent rate. This use of the slow start is extremely helpful in increasing the life of the electrolytic cell. The current will have time to be evenly distributed across the plates and through the water. Rather than providing power with a sudden on switch, using a step change in voltage as was done in the prior art, the use of the ramp will cause the current density to slowly increase across all the plates and give sufficient time for the current density to equalize between all plates and create a uniform current flow through the water to begin electrolysis. This preserves the life of the plates and avoids sudden hotspots as may occur if a step change in voltage is placed on the plates when initially switched on.

The soft power change circuit operates when power is on and is changed from one value to another value. If current is being provided, for example, at one amp and is going to be increased to two amps, the change will be in the form of a ramp that slowly moves from one amp to two amps. This ramp slope is preferred to be more gentle than the soft start ramp and will change the power more slowly. For example, the ramp will be as such that it may take 20 to 30 seconds to change from one amp to two amps.

The controller unit 1420 thus has two soft current change circuits. The first is a steeper slope that is used to place current on the plates from a no-power mode to power on mode and the second is a different, less steep slope, that changes the power from an existing on current flow to a different current value. Of course, such soft start and change circuits are optional and need not be used. If present, they improve performance of the device and extend the life of the cell.

Additional features to the system can include a communication package in the controller including a modem access 1450 via a network interface 1460. Either wireless access or a landline 1465 may be employed. An optional modem board design will be required to access and download data from the controller. Remote trouble shooting of cells and pumps, remote turn on/shut off (lockout) and reset features are also available when a network interface via modem, cable or satellite is used. Process monitoring and control system may be added and are required to be synchronized with the operation of the controller unit 1420. Monitoring of DO, ORP, pH, bacterial counts can be conducted with existing "off the shelf" systems which can be purchased and interfaced to the controller unit 1420. Measurements taken by these devices should be synchronized with the controller unit 1420 so the readings are properly taken in relation to the treatment cycles. Process control equipment such as pH adjustment and the automatic addition of biological/nutrient slurries can also be purchased and interfaced into the controller unit 1420. An optional explosion proof enclosure to house the electronics may be used.

In operation, the communication package in the controller allows recordation and retrieval of data via, for example, an EEPROM. Amperage, voltage, flow rate and failures can be recorded and data may be saved up to thirty days or more.

In the exemplary embodiment, data is gathered and stored in memory in a round robin method, and will always contain the last thirty days of data. Any data older than thirty days will be over written and lost. An alternative memory may be used in which all data is stored on a long term basis.

The control unit includes an appropriate memory and microprocessor for storing data in the memory. The memory can take any acceptable form such as DRAM, SRAM, EEPROM magnetic storage media, disk or the like. The microprocessor will collect such data as the water flow rate continuously or, over selected time periods. It will also collect and store the voltage provided to the plates and the actual current which pass through the plates for the given voltage. The microprocessor also provides a time correlation signal for each of the stored data components so that they may be correlated exactly with each other. For example, the data is stored in such a way that the readout from the memory provides a time correlation between the water flow rate and the current and voltage at a given time. For any given flow rate at a particular time, the current and voltage over the same time period can be known and reviewed. Since each of the values are stored on a time correlated basis, the response of the electronic controller to change& in the water flow rate can be precisely monitored as well as the amount of time required for the response to occur. In addition, the time correlation between a change in voltage and variations in current can also be monitored.

According, to one embodiment, the current and voltage values are converted into digital forms and stored as bytes which can be directly translated into the respective analog values, The electronic signal from the water flow meter is also stored as a digital byte but it can easily be transformed into an analog decimal value so as to determine the gallons per minute of the particular flow rate (or, as desired liters per minute depending on the conversion unit).

According to one embodiment, the microprocessor also stores the current and voltage as averaged over a particular six-hour period during which the cell is active. If the cell is not active at all for an entire six-hour period, the value as stored will be zero for both current and voltage. The average flow rate will be stored for its actual value during that period. Alternatively, if the cell is active for a portion of the six-hour period then, the average current and voltage over that six-hour period is stored. This embodiment has significant advantages in providing data compression for both storage and transmission. Each twenty-four hour day is broken into four, six-hour periods. The average current for each six-hour period is stored, as is the average voltage. Thus, in any given day there were eight data points stored for power, four for current and four for voltage. Data is also stored which provides the time correlation for the date and time of day for each of the respective four data points for current and voltage. The flow is also averaged and stored for the six-hour period. Thus, for each time period only four bytes need be stored, four times a day. A first byte providing the date and time of day, a subsequent byte providing the current, subsequent byte providing the voltage, and the final byte providing the average flow rate. These four bytes are then stored in the memory accessible by the microprocessor. The bytes can then read out transmitted for storage in a master computer, as explained herein. In one embodiment, to save even more memory, a date and time byte need not be stored with each time period. Instead, a starting date and time are known. The subsequent bytes are stored in the order they are collected and read out exactly in the order collected. Thus, the correct byte is sent, the voltage byte and the flow rate byte, followed by the next set of current, voltage and flow bytes. The master computer at the base location knows the starting date and time. It can thereafter add the date and time data and correlate it with the stored data at the master computer. In this embodiment, the date values are stored as raw data in a selected sequence without a limited time correlation as stored. This saves data storage space at remote site 32. If needed, the master computer can add the date and time correlation in the software program stored at the master site. The data transmission will be rapid and reliable, using this 3 byte sequence for each time period.

In summary, the data can be stored using various alternative techniques, each of which has advantages. According to the first technique, the actual current and voltage are directly monitored and stored on a real-time basis, together with the time correlation signal. According to the alternative embodiment, the current, voltage and flow are determined for selected time periods and stored, together with an indication of the time period. This can be done four times a day, for six-hour time periods as has just been described. As a further alternative, the data may be stored and compressed using any other acceptable technique as will be appreciated as equivalent.

In the embodiment including a communications package, the electronic controller contains the communication connector and also access ports. The communications connector may be any acceptable connection to a computer system such as an RS232 connector, a modem, a high speed universal bus connector or any other acceptable communications connector. According to a preferred embodiment, a main computer is connected to the electronic controller via the communications connector on a regular basis, such as once a week, every thirty days, or some other periodic basis. The stored data is then transferred to a master base site which has large storage capability. The master base computer may also have a large display monitor and a video graphics package so as to display the data in various forms such as in tables, graphic layouts or other acceptable techniques which provide easy viewing for those persons monitoring the performance of the electrolytic cell. After the data is downloaded and stored at the master location, from the remote location the memory in the electronic controller can be erased or, if desired, written over since it is no longer needed to be stored within the remote location at the controller because it is stored and saved at the master location. Of course, the electronic controller will also store whether the main power is turned on or off, as well as whether the check system signal has been generated to determine whether or not the system needs to be personally checked or have maintenance performed.

In the exemplary embodiment, the communication package includes a modem with modem speed of 4800 baud with a 4 MHz crystal. Alternatively, modem speed of 9600 baud would require an 8 MHz crystal. The active modem located in the controller panel allows a user to remotely call in and check or change parameters. Alternatively, a connection is located in the controller panel such that the user can hook up a laptop computer to perform the date measurements and make adjustments on site. In yet another embodiment, the amperage, voltage and flow rate can be adjusted manually on site at the controller panel. This flexibility allows the user to monitor and optimize the system at all times.

Additional features to the system may include a back-up gas generator 1470, a wind generation plant 1480 or a solar array 1490.

Figure 15:
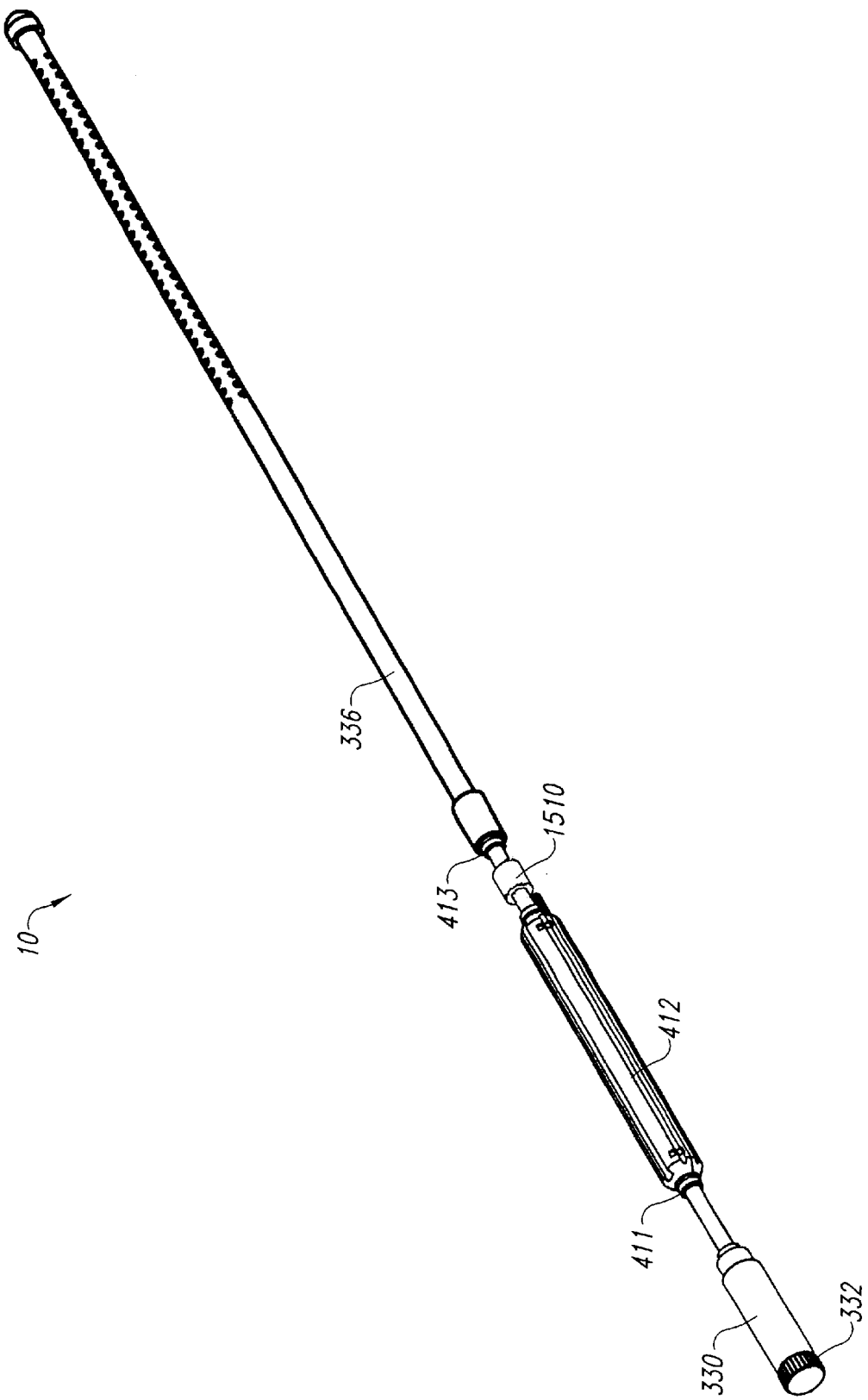
FIG. 15 is an isometric view of one embodiment of the decontamination apparatus according to the principles of the present invention.

FIG. 15 is yet another embodiment of the decontamination apparatus 10. The decontamination apparatus 10 includes a pump 330 with a pump intake 332, an electrolytic cell in a housing 412, a chlorine filter 1510, and a gas distribution chamber 336. A first coupling 411 connects the pump 330 and the cell housing 412 and a second coupling 413 connects the cell housing 412 and the distribution chamber 336.

In one embodiment of the present invention, pump 330 is a positive displacement pump. One example of a suitable pump is a 3-stage diaphragm, positive displacement pump such as Sureflow® Series 9300 Submersible Pump. Typically, particulate count is high in groundwater, especially contaminated groundwater in the instant application. High particulate count causes centrifugal pumps to fail. Failure is caused by particulates clogging the impellers. Positive displacement pumps use diaphragms and tend not to clog even in the presence of particulates. Furthermore, varying groundwater elevation or draw down from the pump can leave a monitoring well dry for periods of time. If a centrifugal pump is run in a dry hole for even a very short period of time, the motor will quickly burn up. A positive displacement pump will not be damaged when run in this situation. This is a significant advantage over centrifigal pumps since water level fluctuations are difficult to predict and control in the field.

Figure 16:
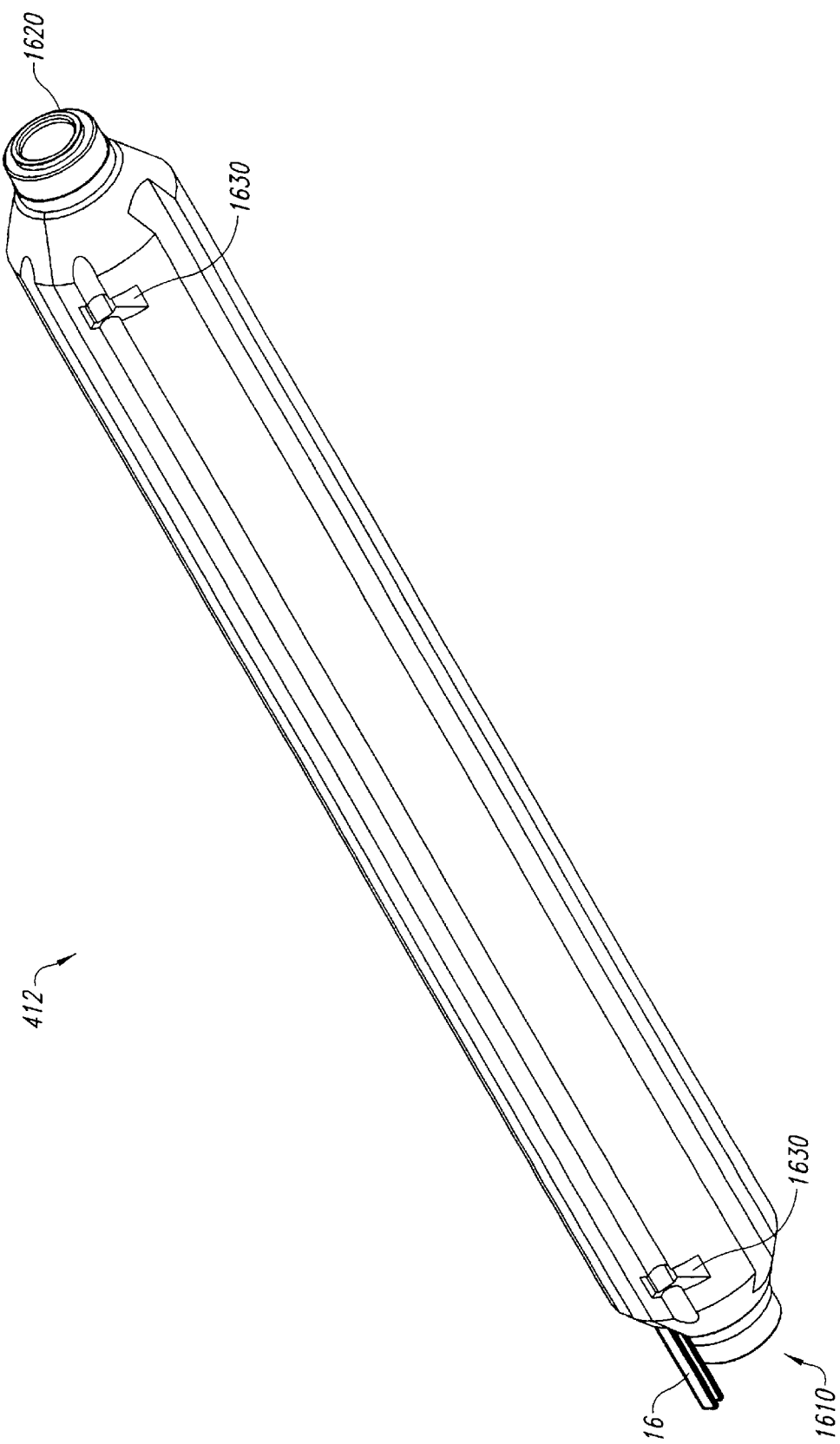
FIG. 16 is an enlarged isometric view of the electrolytic cell plate assembly housing shown in FIG. 15 according to the principles of the present invention.
Figure 17:
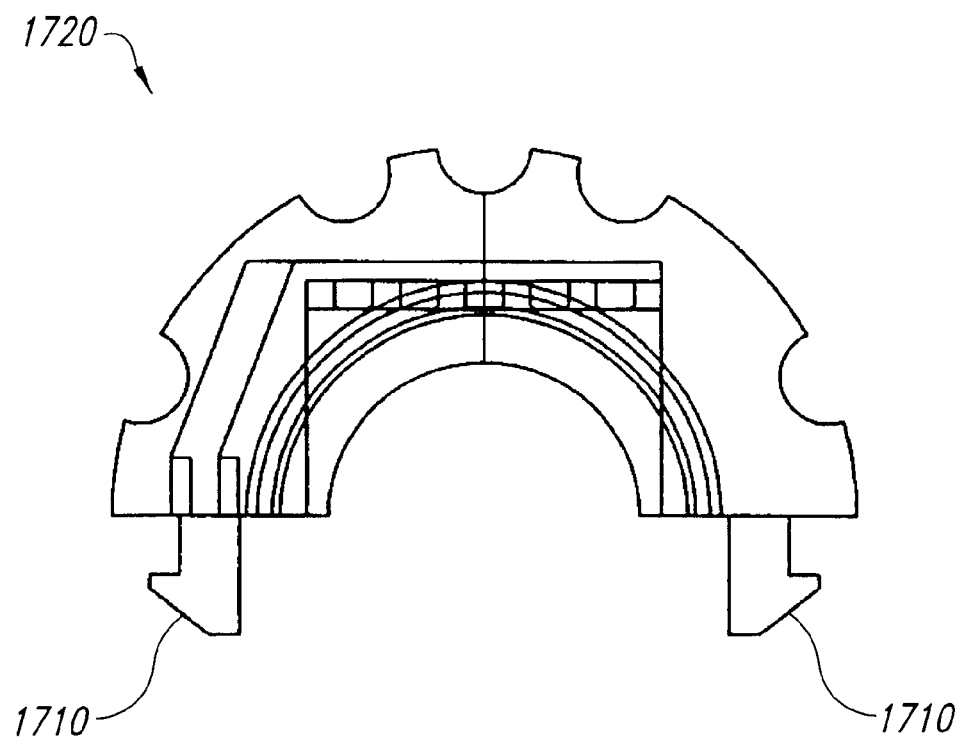
FIG. 17 is a cross-sectional view of one portion of the electrolytic cell plate assembly housing shown in FIG. 16 according to the principles of the present invention.
Figure 18:
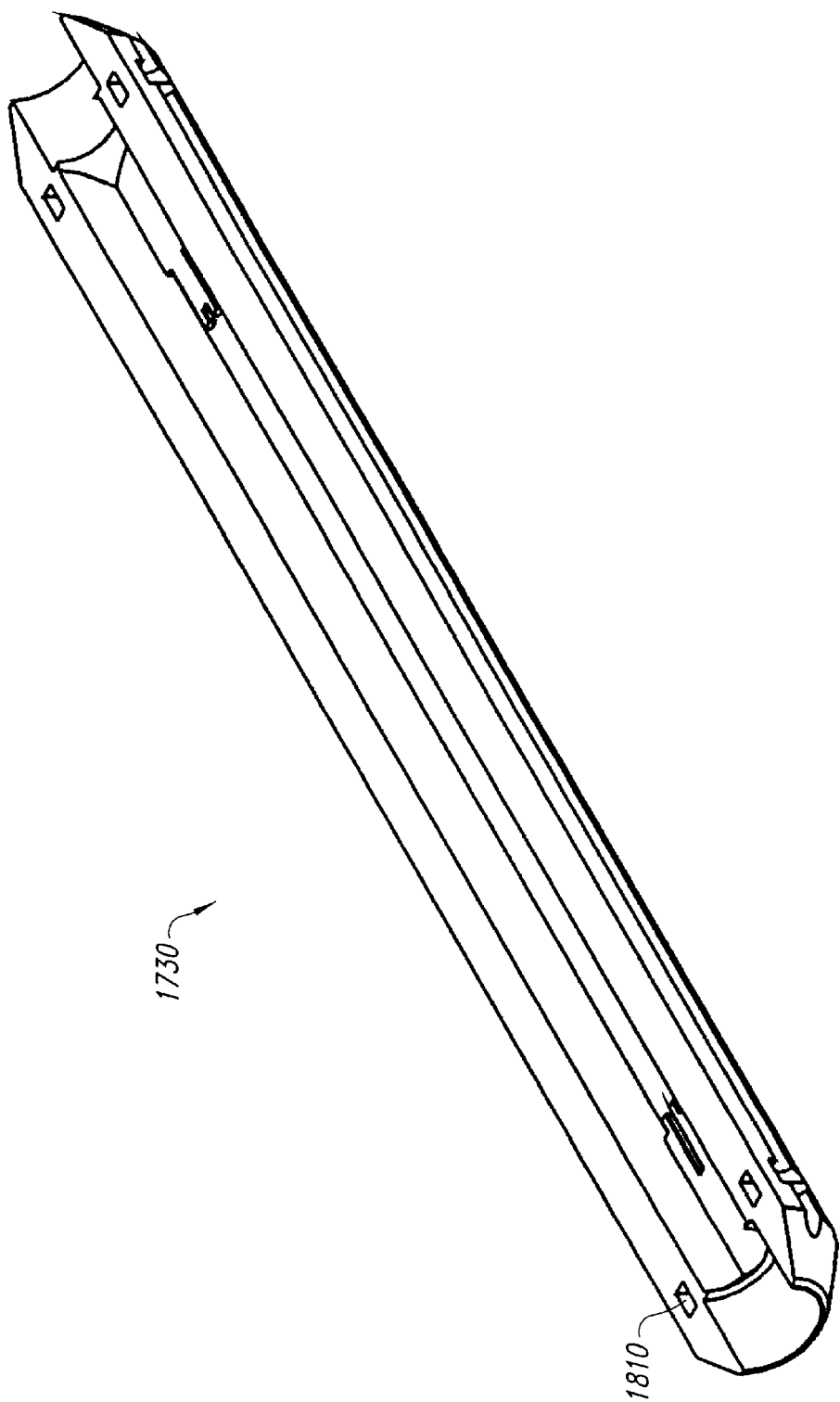
FIG. 18 is an isometric view of one portion of the electrolytic cell plate assembly housing shown in FIG. 17 according to the principles of the present invention.

As further shown in FIGS. 16, 17, 18, and 19 the housing of the present embodiment is a molded or extruded plastic housing. As show in FIGS. 17 and 18, the housing of the present embodiment includes two interlocking halves—1720 shown in FIG. 17 and 1730 shown in FIG. 18. The first half of the housing 1720 includes prongs 1710 extending into receiving ports 1810 of the reciprocal half of the housing 1730 of the electrolytic cell housing 412. When the two halves of the housing 412 are mated together, access to the connecting latches or prongs are provided from a recessed and protected indentation 1630 as shown in FIG. 16. The indentation 1630 prevents accidental release of the prongs 1710 from the ports 1810, while still allowing easy access to the cell as needed for repair, maintenance or cleaning. FIG. 16 farther illustrates couplings 1610 and 1620 at opposite ends of the electrolytic cell assembly housing 412 for coupling the electrolytic cell housing to the pump and to the distribution chamber. The couplings can be manufactured to fit a specific pump coupling design.

FIG. 15 further includes a chlorine filter 1510 positioned after the electrolytic cell 334 and prior to the gas distribution chamber 336. A byproduct of chlorine in contact with organic compounds, such as humic and flavin acids, are trihalomethanes (THM). THMs are considered a hazardous waste. Therefore, if organic compounds are present in the groundwater, a chlorine filter is preferred. The chlorine filter converts the chlorine into chloride. Chloride is not considered a hazardous waste product. One example of a chlorine filter is a copper-zinc catalyst that uses copper and zinc flakes to produce a galvanic reaction. Any chlorines present in the groundwater can be converted by the filter 1510 into chloride prior to the gas distribution chamber 336 and therefore the chlorine does not have the opportunity to react with the organic compounds in the groundwater to produce harmful THMs.

Figure 19:
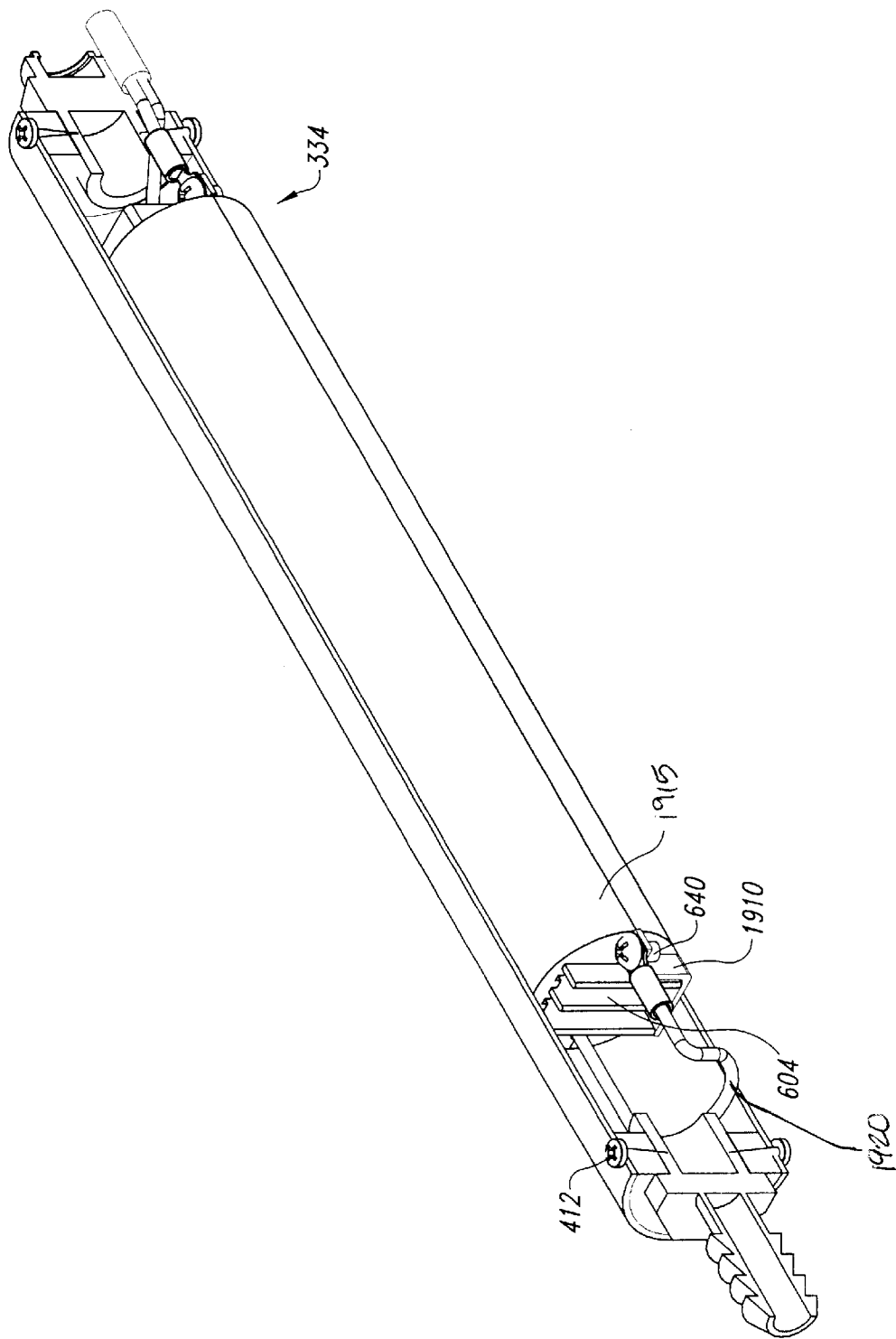
FIG. 19 is an enlarged view of the electrolytic cell plate assembly with the electrolytic cell plate housing assembly cut-away according to the principles of the present invention.

As shown in FIG. 19, electrocatalytic cell plate electrode 604 is contained within a cell plate housing 1915. The cell plate housing 1915 including integral electrode plate rails, is further contained within the electrolytic cell plate assembly housing 412. A titanium bolt 640 connects to an end strap 1910 in the shape of an L-shaped bracket positioned at each end of the plate 604 and power cables 1920. This end strap 1910 connects to the anode plates at one end of the electrolytic cell and the cathode plates at the other end of the electrolytic cell. In one embodiment, the end strap 1910 may be approximately one-half inch in width. The strap 1910 may be welded with conventional techniques to the side of the electrode plate 604, or, alternatively, a plasma weld may be used to secure the strap 1910 to the side of the electrode plate. In one embodiment, the plasma weld, as is known in the art, uses high temperatures in combination with a vacuum and argon to fuse titanium to the electrode plate 604. Plasma welding has several advantages over conventional welding such as a minimal deposit builds up at the location of the weld. Minimizing the weld deposit minimizes flow disruption and allows a more laminar flow pattern for the fluid as it flows past the strap 1910. Improved laminar flow results in a lower pressure drop around the strap 1910 and therefore improves flow such that the loss of dissolved oxygen, calcium, etc. out of solution is minimized. This is a significant improvement in that less power is required to produce the optimal dissolved oxygen in the treated water when flow disruptions are minimized. Furthermore, the system operates more efficiently with fewer pressure drops and flow disruptions.

Figure 20:
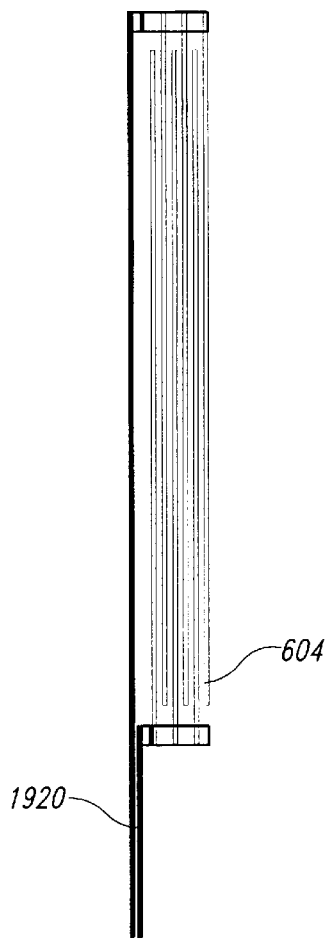
FIG. 20 is a top view of the electrolytic cell plate assembly according to the principles of the present invention.
Figure 21:
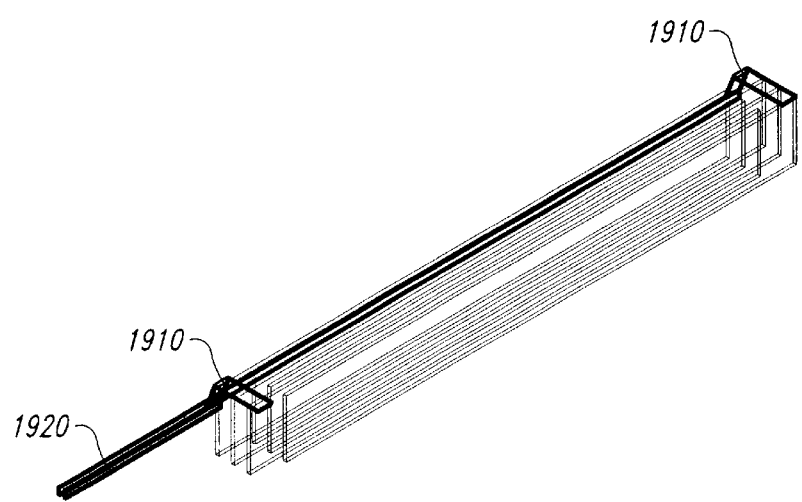
FIG. 21 is an isometric view of the electrolytic cell plate assembly according to the principles of the present invention.

FIGS. 20 and 21 further show the positioning of the metal end strap 1910 welded along the side of electrode plate 604. These end straps 1910 act as conductors to the electrolytic cell and are connected to power cables 1920. Power cables 1920 are connected to the controller unit 1420. The controller unit 1420 provides power to the electrolytic cell via the power cables 1920. One of the advantages of positioning the strap 1910 on the side of the electrode plates 604 as opposed to the top of the electrode plates is to provide a clear and unobstructed flow path for the water and to improve laminar flow through the electrocatalytic cell. If the wide portion of the strap 1910 is positioned perpendicular to the flow of the liquid, a bulkhead is created wherein the flow is disrupted, causing a pressure drop and a subsequent loss of dissolved oxygen out of solution. Minimizing flow disruption improves laminar flow which results in a lower pressure drop around the strap 1910 and therefore improves flow such that the loss of dissolved oxygen, calcium, etc. out of solution is minimized.

Figure 22:
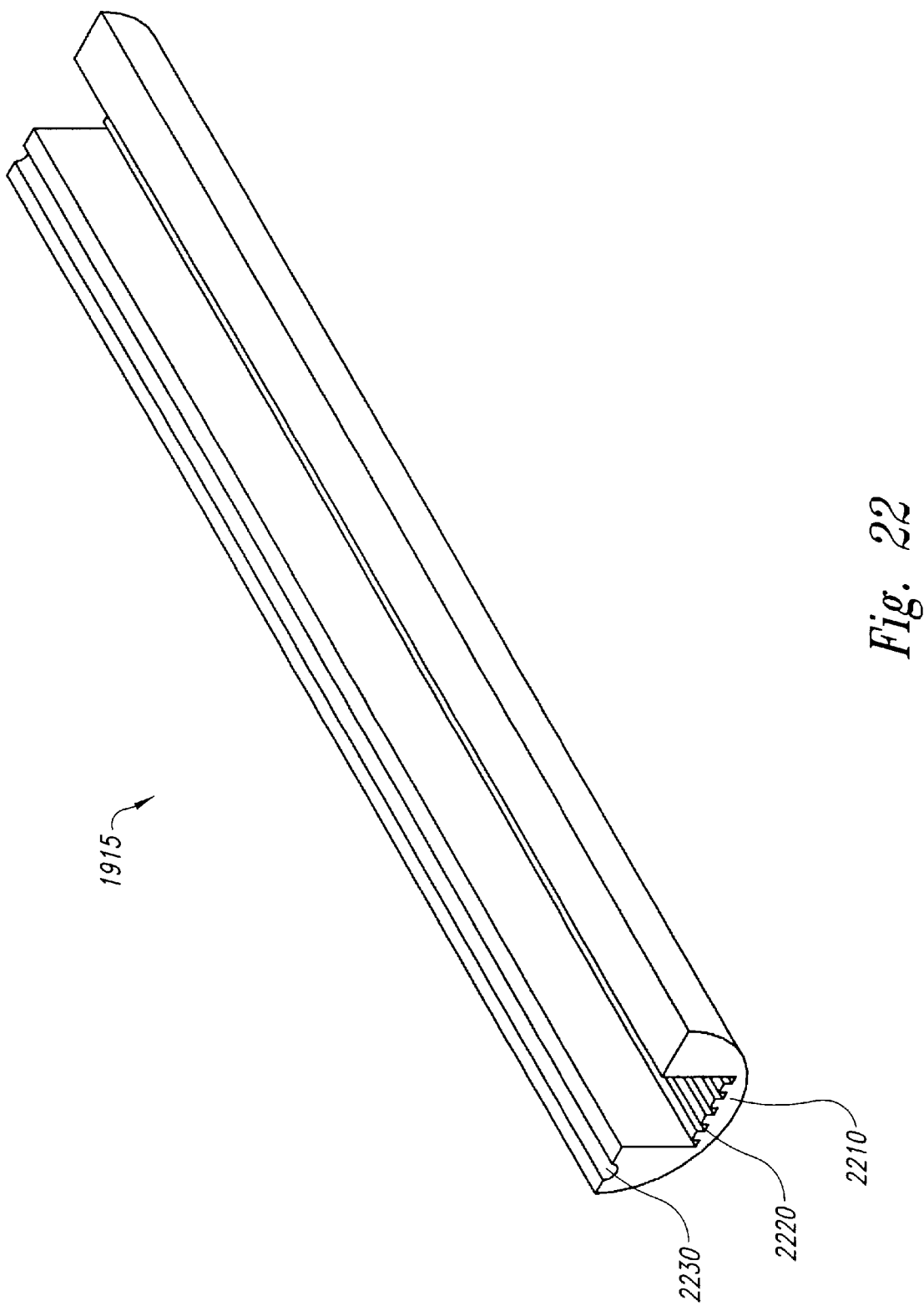
FIG. 22 is an isometric view of one-half of the electrolytic cell plate rail assembly according to the principles of the present invention.

In yet another embodiment of the present invention, the electrode plates 604 shown in FIGS. 20 and 22 include a radiused edge on the inlet side of the anode and cathode plates. Radiusing the edge of the inlet side of the electrode plates 604 further improves laminar flow of the liquid. Improved laminar flow helps prevent mineral deposits on the face of the electrode plates 604 and helps prevent hotspots from occurring. Minimizing mineral deposits and hotspots increase the life of the electrode plates 604 and increase the efficiency of the decontamination system.

FIG. 22 illustrates one half of the electrolytic cell plate housing 1915 with a grooved plate rail 2210. A reciprocal one half of the electrolytic cell plate housing 1915 with a grooved plate rail sandwiches an upper and lower side of the electrode plates 604 wherein an edge of one charging plate 604 extends into one of the grooves 2220 of the plate rail 2210. A second groove 2230 in cell plate housing 1915 allows passageway for the power cord that is attached to the titanium bolt. Integrating the plate rail 2210 into the electrolytic cell plate housing improves the assembly characteristics of the cell assembly. Furthermore, electrode cell plate spacing can be closely monitored and controlled when the cell plate housing includes an integral plate rail. Manufacturability of the assembly is more efficient as fewer pieces are required when the plate rail is integral in the cell plate housing. Additionally, alternative configurations or spacings of the electrode plates are easily accomodated.

Figure 23:
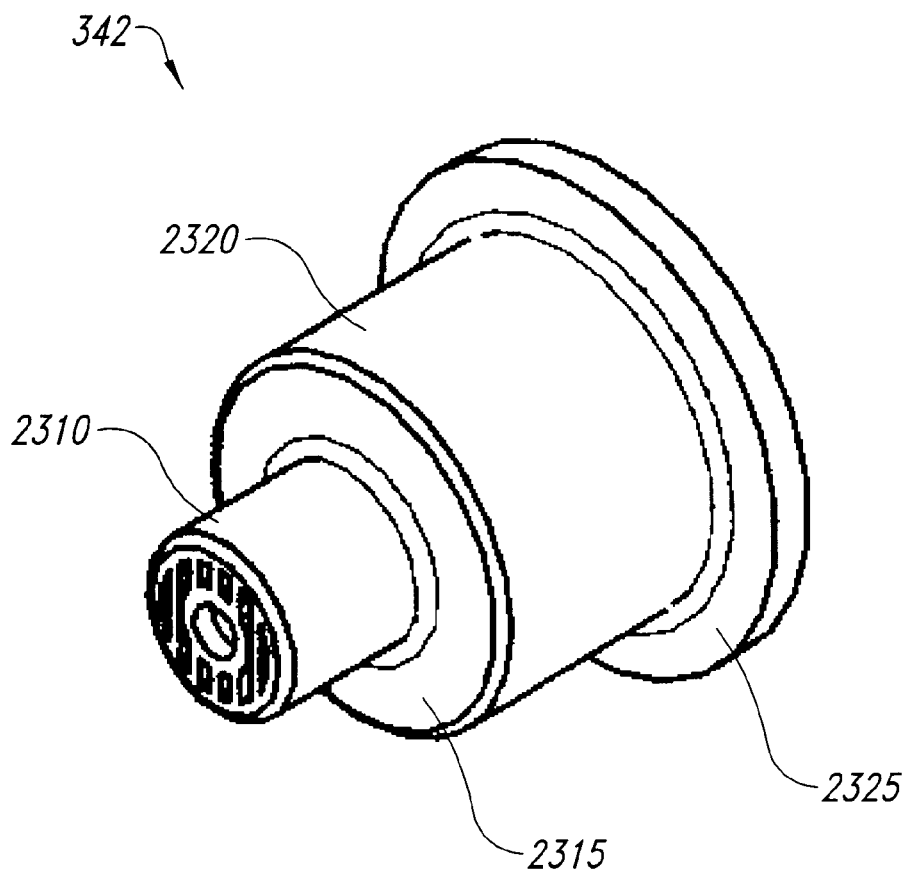
FIG. 23 is an isometric view of the support housing according to the principles of the present invention.

FIG. 23 illustrates yet another embodiment of a gas absorption device 342. The gas absorption device 342 illustrated in this figure is modularized for use in more than one well size. In the illustrated embodiment, the gas absorption device includes a first diameter 2310 for a smaller diameter well opening. The gas absorption device 342 further provides a second diameter 2320 configured to fit in a second and larger diameter well opening. Both diameters 2310, 2320 are configured to fit into the well opening while discouraging gas leakage. In the case of the smaller diameter 2310, an overhang lip 2315 provided by the base of the larger diameter 2320 rests on the top of the well casing or the ground to provide a seal. In the case of the larger diameter 2320, a bottom well cap 2325 rests on the top of the well casing to provide a seal. A gas cap such as the one illustrated in the current embodiment allows flexibility and use in multiple diameter wells. This is advantageous for both manufacturability since one design works with multiple well sizes, as well as stocking of components for the system in inventory. In the present embodiment, a preferable size for the smaller diameter 2310 is two inches and a preferable size for the larger diameter 2320 is four inches.

In operation, power is supplied to the pump and the pump creates a circulation of the fluid in the well. Alternatively, groundwater flow may create circulation of the fluid. As power is supplied to the electrolytic cell, the passage of electric current causes some of the water molecules to split into their component parts creating hydrogen gas and oxygen gas. As the gases travel upward through the gas distribution tube, the oxygen gas dissolves into dissolved oxygen. Actual dissolved oxygen will depend on the absorption of the oxygen gas produced. Absorption will vary with temperature and water column height. The oxygen gas can serve to clean or remove contaminants from the groundwater in reactions known in the art and previously published in many literature sources. In addition, the free hydrogen gas can also act to inhibit the problems of pollution from hydrocarbons. A number of chain reactions and molecule division and creation are possible depending on the contaminants found in the groundwater, the specific treatment process employed, enzymes, chemicals, or vitamins added to facilitate and accelerate the process, etc. In one possible reaction, the hydrogen gas or hydrogen radical can abstract a hydrogen atom to form water, as with alkanes or alcohols:

•Hydrogen Abstraction

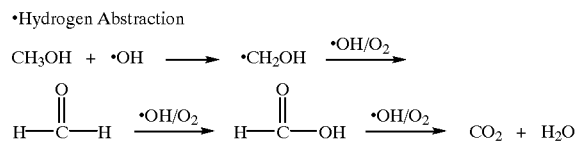

In another possible reaction, the hydroxyl radical can add to a contaminant, as is the case for olefins or aromatic compounds in the following reaction:

•Addition

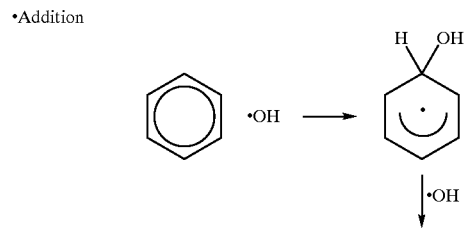

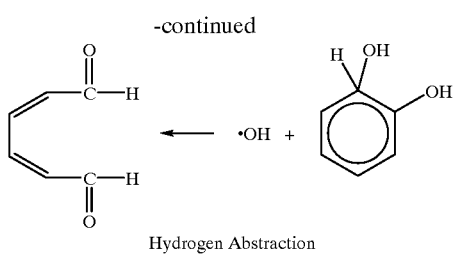

Hydrogen Abstraction

This application of electrocatalytic chemistry using both oxygen and hydrogen results in the overall rate of oxidation of a contaminant being greatly increased over that obtained by the simple addition of oxidizing agents (i.e., oxygen, ozone, permanganate or peroxide, etc.). In large part, this is due to the much greater involvement of highly reactive initiators (radicals) such as the hydroxyl radical (OH) created by the metallic alloys on the electrolytic cell. The hydroxyl radical reactor typically million to a billion-times faster than ozone and hydrogen peroxide, resulting in a greatly reduced treatment cost and system size.

As shown by the above exemplary chemical reactions, the attack by the hydroxyl radical, in the presence of oxygen, initiates a complex cascade of oxidative reactions leading to mineralization. As a rule of thumb, the rate of destruction of a contaminant is approximately proportional to the rate constant for the contaminant with the hydroxyl radical. Alkenes are treated most efficiently because the double bond is very susceptible to hydroxyl attack; saturated molecules (i.e., alkanes) have much smaller rate constants and therefore, are more difficult to oxidize.

Testing for total petroleum hydrocarbon (TPH), chemical oxygen demand (COD) and BTEX reveals reductions in the total organic load. This can be attributed to the effects of hydroxyl radicals produced by the electrocatalytic cell system.

The general reduction in the total petroleum hydrocarbon is due to the electrocatalytic cell production of the hydroxyl radicals (OH). Hydroxyl radicals within highly contaminated wells mineralize a broad range of organic compounds. The groundwater leaving this impacted well will then contain less organic compounds and also will have reduced the chemical oxygen demand in the aquifer.

Dissolved oxygen plays an integral part in the aerobic biological remediation of a total petroleum hydrocarbon impacted site. The dissolved oxygen produced by the electrocatalytic cell of the present invention each day was calculated to be 2,984 mg. Use of the decontamination apparatus has resulted in the increase in the heterotrophic plate counts for aerobic bacteria in the surrounding monitoring wells. As the total petroleum hydrocarbon decreases, in time so would the bacterial populations with a diminished carbon source. Thus, field study provides information as to the beneficial effects of applying dissolved oxygen into the contaminated groundwater aquifer by either chemical or physical means.

In another additional feature, the pump cell and gas distribution tube as shown in the exemplary embodiment are hooked together with flexible tubing to allow the decontamination system to bend if needed. This flexibility allows the system to be installed in environments that require a non-linear installation.

In yet another embodiment of the invention, a plurality of decontamination systems is provided. For example, the decontamination system may consist of four electrolytic cells and one electronic controller. The system may be used in the treatment of impurities in an aquifer by increasing the dissolved oxygen content at various locations in the aquifer to speed remediation. The controller controls multiple submersible pumps coupled to electrolytic cells to provide water flow through the cells. The controller provides a current flow to electrode plates in the electrolytic cell that through electrolysis causes the increase in dissolved oxygen.

In one embodiment of the present invention, the controller includes the following components: 48 VDC Power Supply; 24 VDC Power Supply; Constant Current Source Board; Main Controller Board; Polarity Relay Board; External Modem; Panel Meter; Selector Switch for Voltage and Amperage Readings; and Internal On/Off Power Switch.

In this exemplary embodiment, the 48 VDC Supply may be a standard switchmode supply as is known in the art. The input power may be 110–120 VAC at 8 Amps. The maximum output rating is 48 VDC at 6 Amps. This supply is used as the power source for the electrolytic cells. The output of this supply is cabled to the Constant Current Source Board.

In this exemplary embodiment, the 24 VDC Supply may be a standard switchmode supply as is known in the art. The input power may be 110–120 VAC at 8 Amps. The maximum output rating is 24 VDC at 7 Amps. This supply is used as the power source for the Main Controller Board, Polarity Relay boards Panel Meter, and the submersible pump power after stepping the voltage down to 12 VDC.

In this embodiment, the Constant Current Source Board is a custom electronic assembly that provides a constant current to the electrocatalytic cell of the decontamination apparatus. It is capable of regulating currents from 1–5 Amps, via an on board potentiometer, with a maximum compliance voltage of 48 VDC. This unit uses switch mode technology to keep efficiency at a maximum level. The input to this board is provided from the 48 VDC supply. The regulated current output of this assembly is wired to the Polarity Relay board.

In this exemplary embodiment, the Main Controller Board provides all timing, failure monitoring, status indicators, data collection, and external modem communication for the external cells and pumps. This board has an internal PIC microcontroller with embedded firmware. The controller can be set for example, via a 4-position dip switch to control from one to four cell pump combinations. The amount of time a cell is active is controlled by an on board four position dip switch. The cell active time can be varied from two to thirty minutes. The cell cycle time is set by another on-board four-position dip switch. The cell cycle time can be varied for example, from zero to seven hours. The pump time is correlated to the cell active time plus a three-minute treatment flush period. This controller unit configuration has limitations of only one cell and pump combination being active at any given treatment time. The controller also provides means to monitor both the pump and cell current for failure conditions. In this embodiment, the hard coded failure conditions are cell or pump current below one amp or above 5 amps. The controller board provides status monitoring bi-color LED's. The LED's are lit green during each cell active time. The LED's are lit red when a failure condition is encountered during two successive treatment cycles. The pumps are controlled via a pulse width modulated signal to provide two pump speeds. In the exemplary embodiment, there is a three-gallon per minute treatment and a five-gallon per minute flush cycle. The controller also provides, via onboard EEPROM data storage of version level firmware, number of cells in system, timing configuration, cell status, failure mode, average cell current for a one month period, and average pump current for a one month period. The unit provides RS232 communication to an external modem for data retrieval and future timing updates. The unit provides a relay drive signal such that a reversal of power polarity to the cells can be accomplished every other treatment cycle. The controller provides a relay drive signal to turn on each cell as required.

In the exemplary embodiment, the following data is input into the Main Controller Board: input voltage at +12 VDC; GND; and Cell Current sense from Polarity Relay board. The following data is output from the Main Controller Board: polarity relay drive signal to the Polarity Relay board; four independent cell relay drive signals to the Polarity Relay board; eight bi-directional signal lines for controlling the status/failure LED's; four independent Pump FET drive circuits for Pump control; and RS232 communications to the external modem.

The Polarity Relay board is an electromechanical relay board to select which cell receives the current sink output voltage and the polarity of the voltage to the cell being selected. This board gets the relay drive signals from the Main Controller Board. It has an on board current sense resistor to provide the current sense voltage back to the Main Controller Board for failure monitoring and data storage. This board's input voltage is 12 VDC. It also provides the voltage scaling electronics for the external panel meter.

The external modem for example can be a standard Hayes compatible type. The modem may be set via the Main Controller Board in an Auto answer mode. When dialed into, the modem remotely provides a means to access the on board data storage. The modem may also provide a means to custom tailor the timing of each cell and pump independently, regardless of the hardware settings.

The panel meter may be a standard +/−1 VDC Meter as is known in the art. The panel meter may be used to display the cell's voltage and amperage. The selector switch allows selection of the voltage or current display on the panel meter. The internal power switch provides a means for disconnecting all input AC power to the decontamination apparatus.

In this exemplary embodiment, the initialization and operation of the decontamination apparatus initiates when AC power is connected to the unit and the internal power switch is turned on in operation. The 48 VDC supply then comes up to level and it applies voltage to the Constant current board. The Main Controller Board scans the dip switch to identify the number of cells in the system. The Main Controller Board scans the electrocatalytic cell on-time dip switch to determine the cell on-time. The Main Controller Board scans the cycle time dip switch to determine the cycle time. The Main Controller Board scans the Reverse polarity dip switch to determine its status. The Main Controller Board then writes this data to the EEPROM for storage. The Main Controller Board then turns on a first cell relay, Activates a first pump drive circuit at the treatment speed, and starts its timer based on the cell on-time dip switch setting. The Main Controller then starts monitoring and recording data for the cell and pump current. If the current to the cell and pump are within limits the unit will operate until the cell on-time is expired. If the current to the cell and pump are outside the limits then the controller will cut the power to both the cell and pump and flag them for potential failure on the next treatment cycle. During this period of no power to the cell and pump, the timer is still running to the cell on-time limit. When the cell on-time is expired the Main Controller will turn off the relay drive signal for the cell. The Main Controller will also increase the pump drive circuit to the flush speed and leave it active for an additional three minutes. When the three-minute flush period is expired the Main Controller will remove power to the pump drive circuit and start a second cell's treatment cycle. These steps are then repeated for all cells in the system based on the reading on the dip switch. When all cells have gone through the on-time phase, the Main Controller will start the cycle timer based on the reading on the dip switch and remain inactive until the timer expires. The Main Controller then repeats the previous step in the reversed polarity mode if the reverse polarity is enabled or in the same polarity if the reverse polarity is not enabled.

Figure 24:
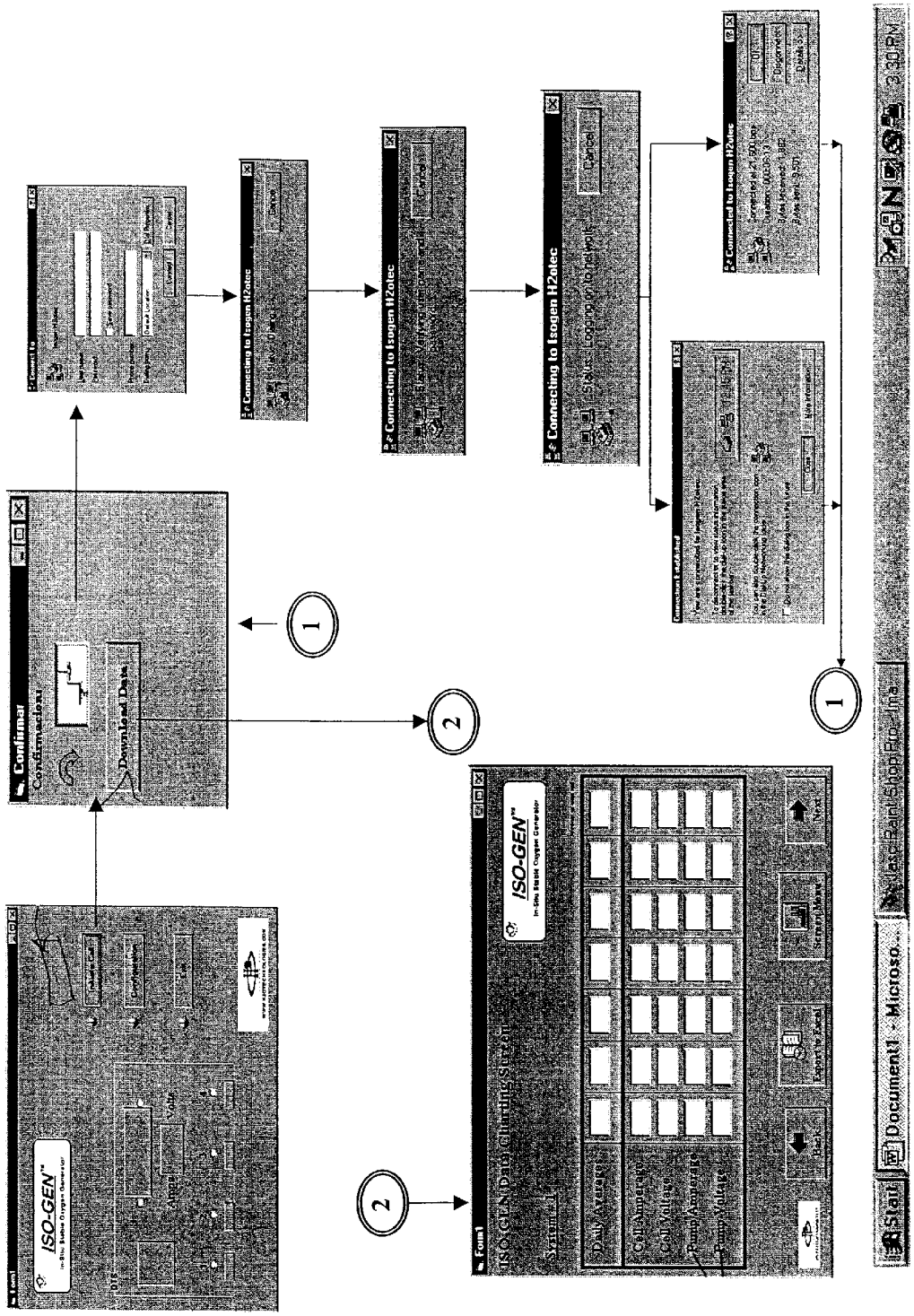
FIG. 24 is a flowchart illustrating the view screens of the controller unit of the communication package according to the principles of the present invention.

FIGS. 24 through 29 illustrate flowcharts of the screen views shown on a computer when using the communication package. FIG. 24 illustrates an overview of the screen shots including: a main screen with a button to initiate a modem call and a button to confirm the configuration of the system; a configuration screen; various connecting screens and a data chart screen.

Figure 25:
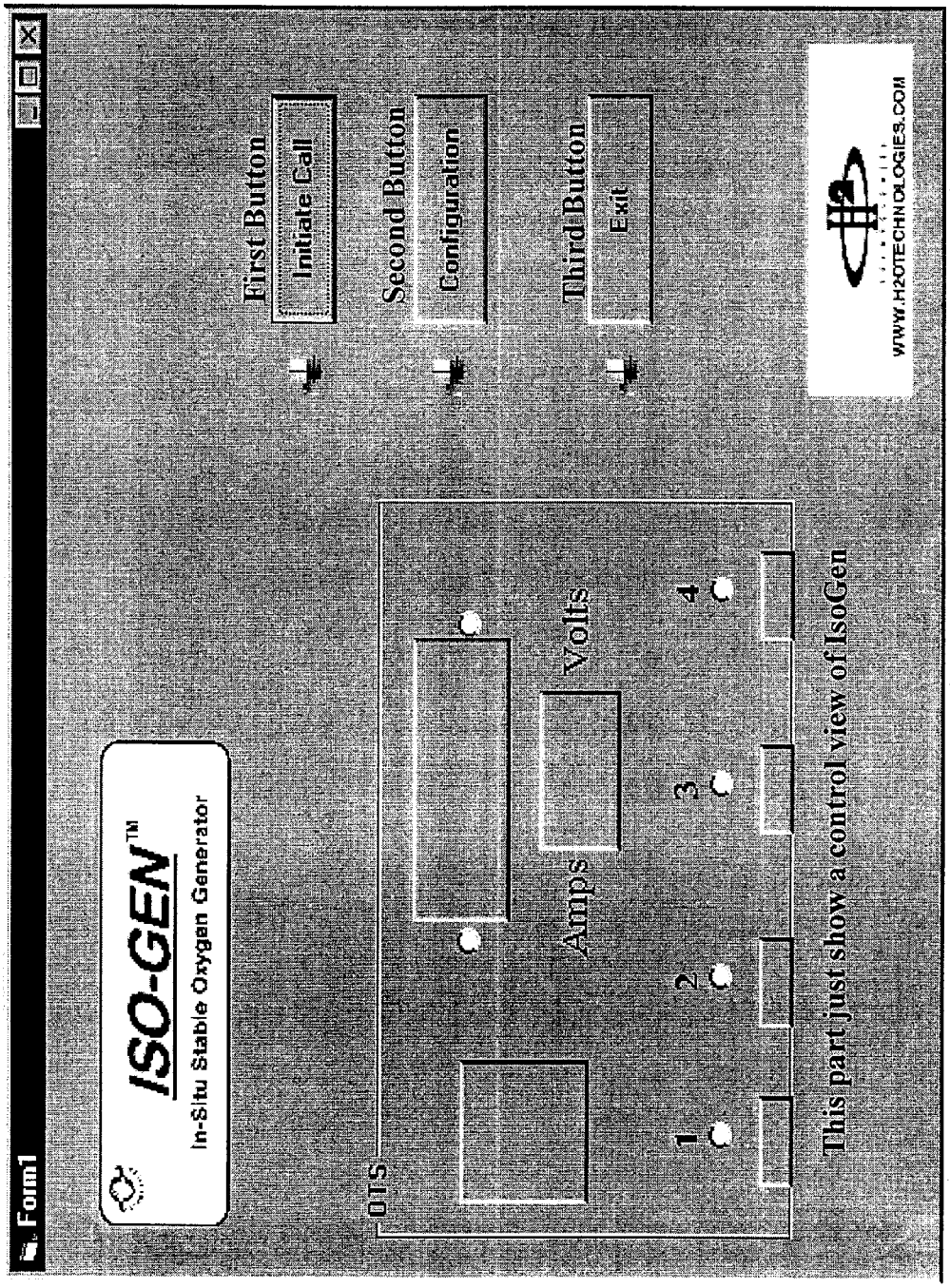
FIG. 25 is an enlarged screen view illustrating the main screen of FIG. 24 according to the principles of the present invention.

FIG. 25 is an enlarged view of the main screen shown in FIG. 24. As is shown in FIG. 24, the main screen includes a first button to initiate the modem call, a second button to confirm the configuration of the system, and a third button to exit the communications program. Additional buttons are provided to yield specific information on amperage and voltage on the individual cells in the system.

FIG. 26 illustrates one embodiment of the data that can be verified via the configuration button. System configuration information includes: serial number, download date, number of cells in system, cycle time of each cell, cleaning cycle of each cell, dwell time of each cell, polarity reversal time of each cell, indicator of cell failure, indicator of pump failure and an indicator of whether the cell is on or off. Other data may be included in the system configuration verification.

Figure 27:
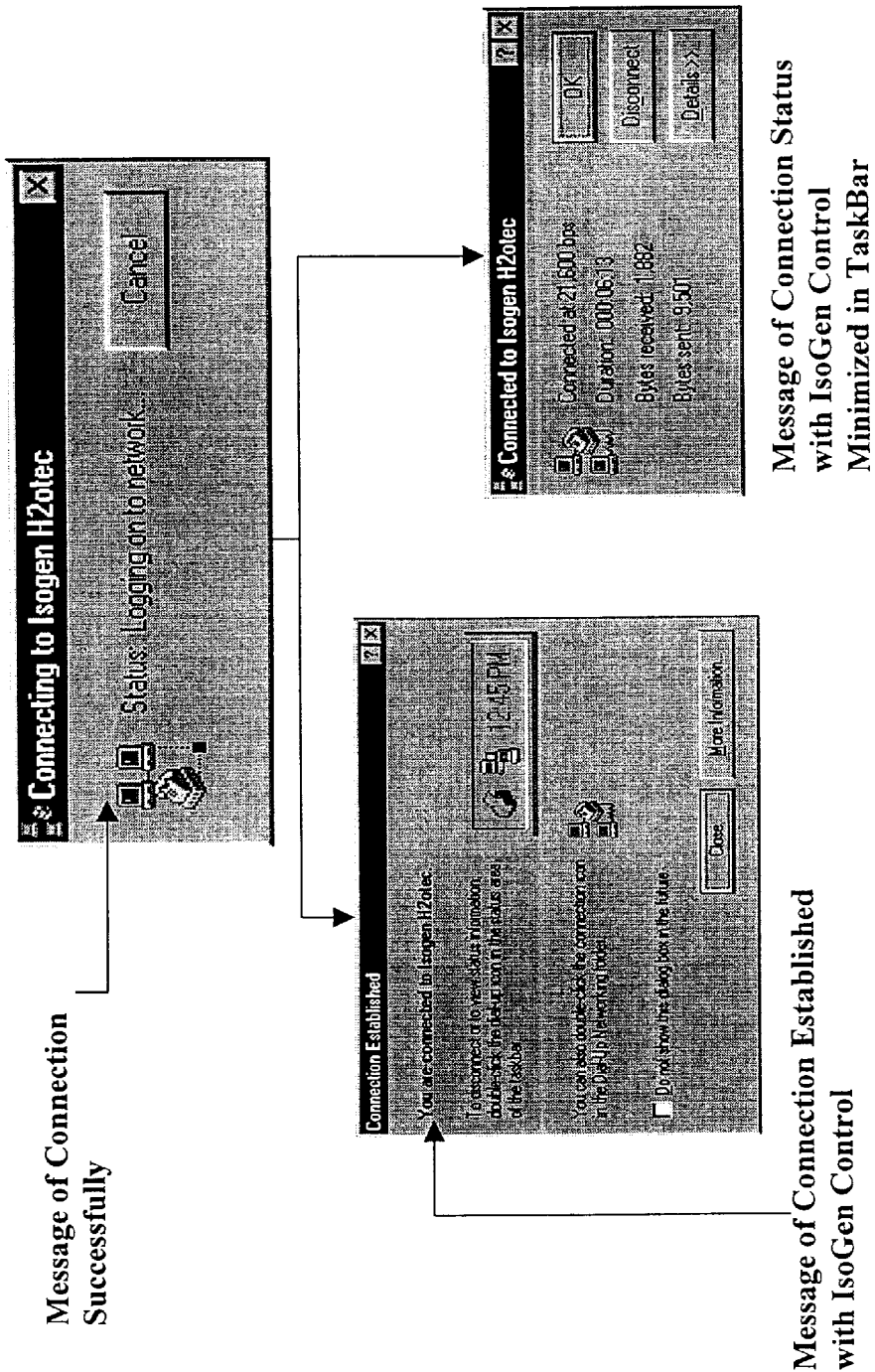
FIG. 27 is a flowchart further illustrating the screen view of FIG. 24 according to the principles of the present invention.
Figure 28:
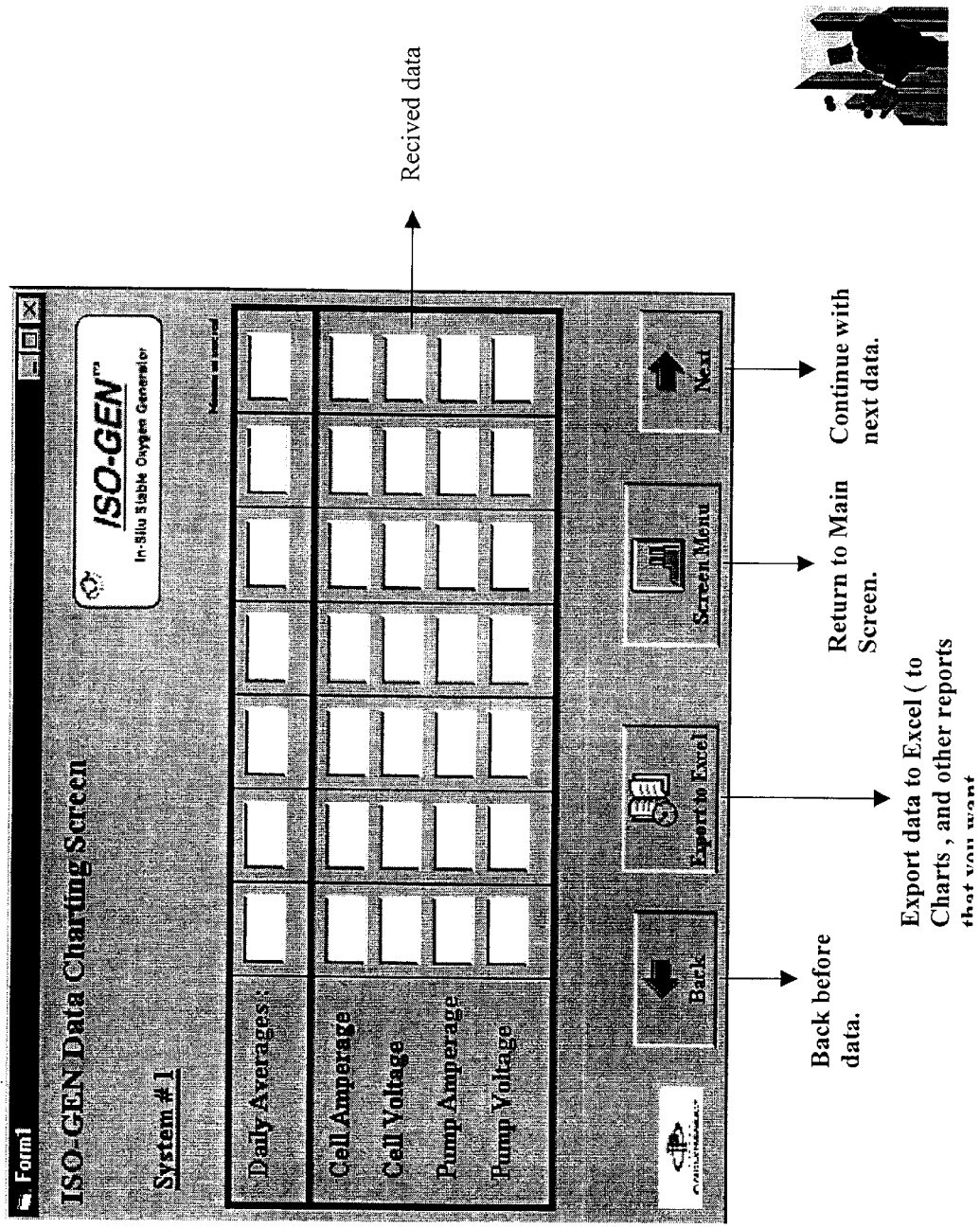
FIG. 28 is an enlarged screen view of the data screen of FIG. 24 according to the principles of the present invention.

FIG. 27 illustrates one embodiment of screen views associated with the initiate call button. The system logs on remotely as is known for remote or internet access. FIG. 28 further illustrate screen view of the initiation step of remotely retrieving and manipulating data via the communication package.

Figure 29:
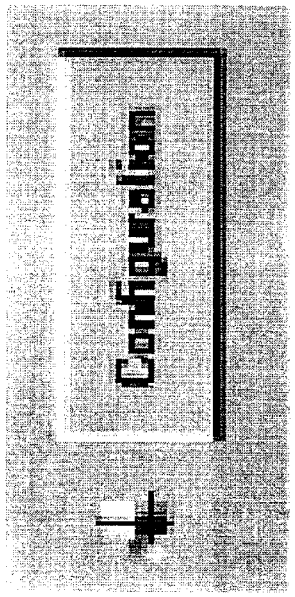
FIG. 29 is an enlarged view of the configuration button of FIG. 24 according to the principles of the present invention.

FIG. 29 illustrates an enlarged view of one embodiment of the data-reporting screen displaying data for the system. In this embodiment, displayed data includes: daily averages, cell amperage, cell voltage, pump amperage, and pump voltage. Data is shown for each cell operating in the system. Additional icon buttons are provided: to download the data to a spreadsheet or into a different reporting presentation such as a chart; to return to the main screen menu; to scroll forward through additional data; or to review previously viewed data.

From the foregoing it will be appreciated that, although specific embodiments of the invention have been described herein for purposes of illustration, various modifications may be made without deviating from the spirit and scope of the invention. Accordingly, the invention is not limited except as by the appended claims.

EXAMPLE 1—APPLICATION

The object of this experiment was to field test the decontamination system. The following is a description of the equipment used:

A. Cell

Two cells were constructed for this installation. Both cells used the standard loading EC-400 plate coating. These cells could be reversed. The cells were disposable and were not rebuildable. Estimated life of the ISO-GEN cells was 90 days.

B. Pump

The pump used for this installation was a DC purge pump manufactured and sold by Enviro-Tech Services Co. This pump circulates water inside the well at approximately 3 gpm. It had a stainless impeller, nitrile seals and an ABS casing. This pump was classified as a "purge pump" and was not designed for long continuous duty operation. The manufacturer recommends that the pump will last for approximately 300 to 450 hours and then it will need replacing. This pump should be monitored closely for failure during its operation.

C. Electronic Controller

The controller includes a DC pump interface to control the new pump, a change in the software to make the controller run as a constant current device until it runs out of available voltage (mainly due to plating of the cell) at which time it will revert to constant voltage and run at its maximum voltage output. A modem will also be used to allow for remote dial up of the controller for data collection purposes.

D. Gas Distribution Chamber

The distribution chamber was constructed from ½-inch PVC and the hole size was 3/16 inch (instead of ⅛ inch) to accommodate for buildup of any materials through the holes.

The following results were recorded from the field test of the decontamination system:

|  | 6/10/99 | 7/14/99 | 8/12/99 | 9/10/99 | % Change | 10/12/99 |
|---|---|---|---|---|---|---|
| Benzene | 0.183 | 0.033 | 0.011 | 0.006 | 97% | 0.003 |
| Toluene | 0.188 | 0.005 | 0.002 | 0.002 | 99% | 0.001 |
| EthylBnz | 0.221 | 0.103 | 0.063 | 0.020 | 91% | 0.030 |
| Total Xylene | 0.177 | 0.241 | 0.192 | 0.078 | 56% | 0.041 |
| Dissolved Oxygen | 0.9 | 17.4 | 14.7 | 16.7 |  | 15.4 |
| LBL | 0% | 0% | 0% | 0% |  | 0% |

All results except LEL (lower explosion limit) are in mg/l (ppm).

EXAMPLE 2

Product Definition—ISO-GEN Rev. 1

Power and Timing:

1. 3–5 amps at 48 volts DC current max to Oxygenation cell. Amperage is user adjustable via a pot mounted to the CPU card inside the controller.
2. Power supply to the cell is switcher technology and constant current in operation. Pulse Width Modulation can be used to control cell current (PWM)
3. Pump power supply is constant voltage in design. Voltage output is adjusted automatically to change speed of pump for cleaning cycle. PWM is also used to switch pump speeds. Controller will operate either a 12 or 24 VDC pump by setting an onboard selector switch.
4. Timing and drive to the cell is initiated by the internal timing of the unit.
5. Timing is as follows:
    Cycle time (in minutes) refers to the length of time the cell has power.
    Clean time (in minutes) refers to the length of time the pump will operate after the cell is turned off. The pump will double its speed for the clean time.
    Dwell time (in minutes) is the length of time the unit waits before it treats the same well again.
6. Timing parameters are programmed into main memory and can be altered by replacing the main IC chip.

Manual means are provided to cut the programmed timing in half by connecting a jumper wire.

7. Failure modes:
   Cell failure—the cell is considered failed if the amperage decreases below 1 amp or if the cell amps increase over 5 amps. It is also considered a failure if the cell has a direct short.
   Pump failure—the pump is considered failed if the amperage decreases below 1 amp or over 5 amps.
   If any of the above failures are triggered, the failed cell and pump system must be turned off though no failure indicator light will be illuminated. The controller should then wait for the remainder of the programmed treatment time for the failed system before cycling to the next system. When the controller cycles back to the failed system it should try to restart the failed system, if the system still reads failure then the red light will be illuminated and the controller will dwell for the time assigned to the failed system.

8. Failure indicators:
   Cell or pump failure—A red-green LED is used to indicate a failure condition at the cell. A pattern will flash to indicate if the cell or pump has failed.

9. The controller includes a main power on-off switch mounted inside the controller.

10. Input power of 110 or 220 VAC power.

11. Controller meets UL approval.

12. A modem and software is provided to download stored data such as cell amps and voltage, pump amps and voltage, and on-times. The unit has the capacity to store 30 days worth of operational data.

Physical

1. Power to the cell and pump will require no external cabling from the factory. However, provisions must be made to connect these peripherals to the unit by the installer.

2. Cell and pump will utilize suitable cable provided by the installer.

3. Enclosure is NEMA 4.

4. All cabling in and out of the controller will be hard wired to the controller by the installer.

5. Red-green LED's are mounted to the front panel to indicate system on, normal operation and failure mode.

EXAMPLE 3

This embodiment of the present invention includes a communication package allowing remote access and control of the decontamination apparatus.

Power and Timing:

1. 3–5 amps at 48 volts DC current max to Oxygenation cell. Amperage is user adjustable via a pot mounted to the CPU card inside the controller. Individual amperage levels can be set for each well system.

2. Power supply to the cell is switcher technology and constant current in operation. Pulse Width Modulation can be used to control cell current (PWM).

3. Pump power supply is constant voltage in design. Voltage output must be adjusted automatically to change speed of pump for cleaning cycle. PWM is also used to switch pump speeds. Controller will operate either a 12 or 24 VDC pump be setting an on board selector switch.

4. Timing and drive to the cell is initiated by the internal timing of the unit.

5. Time is as follows: All parameters adjustable by remote software.
   Cycle time (in minutes) refers to the length of time the cell has power.
   Clean time (in minutes) refers to the length of time the pump will operate after the cell is turned off. The pump will double its speed for the clean time.
   Dwell time (in minutes) is the length of time the unit waits before it treats the same well again.

6. Timing parameters can be adjusted on site (within a specified range) or remotely via the communications software.

7. Failure modes:
   Cell failure—the cell is considered failed if the amperage decreases below 1 amp or if the cell amps increase over 5 amps. It is also considered a failure if the cell has a direct short.
   Pump failure—the pump is considered failed if the amperage decreases below 1 amp or over 5 amps.
   If any of the above failures are triggered, the failed cell and pump system must be turned off though no failure indicator light will be illuminated. The controller should then wait for the remainder of the programmed treatment time for the failed system before cycling to the next system. When the controller cycles back to the failed system it should try to restart the failed system, if the system still reads failure than the red light will be illuminated and the controller will dwell for the time assigned to the failed system.

8. Failure indicators:
   Cell or pump failure—a red-green LED is used to indicate a failure condition at the cell. A pattern will flash to indicate if the cell or pump has failed.

9. The controller includes a main power on-off switch mounted inside the controller.

10. Input power of 110 or 220 VAC power.

11. Controller meets UL approval.

12. A modem and software is provided to download stored data such as cell amps and voltage; pump amps and voltage and on-times. The unit has the capacity to store 30 days worth of operational data.

Physical

1. Power to the cell and pump will require no external cabling from the factory. However, provisions must be made to connect these peripherals to the unit by the installer.

2. Cell and pump will utilize suitable cable provided by the installer.

3. Enclosure is NEMA 4.

4. All cabling in and out of the controller will be hard wired to the controller by the installer.

5. Red-green LED's are mounted to the front panel to indicate system on, normal operation and failure mode.

What is claimed is:

1. A system for in situ decontamination of contaminated groundwater, comprising:
   at least one of a housing having an inlet, an outlet, an exterior side and an interior side, the inlet of the housing positioned to intake groundwater and the outlet of the housing allowing treated groundwater to flow therethrough;
   at least one of an electrolytic cell enclosed in at least one of the housings;
   at least one of a gas distribution chamber extending vertically from the outlet of at least one of the housings of the electrolytic cells, the distribution chamber including an opening at an end distal to the electrolytic cell for treated groundwater to flow therethrough; and a control unit electronically coupled to the electrolytic cells, wherein the control unit provides an electric current flow to electrode plates in the electrolytic cells.

2. The system of claim 1 wherein the gas distribution chambers are vertically oriented and longitudinally extend a selected vertical distance above the outlet of the respective housing.

3. The system of claim 1 wherein the housing for the electrolytic cell is constructed of a molded or extruded plastic.

4. The system of claim 1 wherein the housing further includes two interlocking halves to house the electrolytic cell.

5. The system of claim 4 wherein the interlocking halves of the housing include at least one of a prong on a first interlocking half of the housing and at least one of a reciprocal receiving port on a second interlocking half of the housing, wherein the prong of the first half extends into the reciprocal receiving port of the second half to provide the interlocking connection.

6. The system of claim 5 wherein access to the interlocking connection is recessed from the exterior side of the housing to provide protection from accidental release of the interlocking connection.

7. The system of claim 1 wherein the interior side of the housing is grooved to receive a plate rail from the electrolytic cell contained therein.

8. The system of claim 1 further including a pump coupled to the inlet of the housing.

9. The system of claim 8 wherein the pump is a submersible pump.

10. The system of claim 1 wherein the control unit further includes a dissolved oxygen meter with a feedback loop connected to a power supply for the system.

11. The system of claim 1 wherein the control unit further includes a soft start circuit wherein the soft start circuit allows power to be ramped up from an initial off position to a designated power level.

12. The system of claim 1 further including a communication package communicating with the control unit, wherein the communication package includes a microprocessor for recording data and a connection port for retrieving data.

13. The system of claim 12 wherein the connection port is a modem connection.

14. The system of claim 1 further including a chlorine filter coupled to at least one of the outlets of the housings.

15. The system of claim 14 wherein the chlorine filter is a copper-zinc catalyst that converts chlorine into chloride when organic compounds are present in the groundwater.

16. An hydrodynamically improved electrocatalytic cell assembly for allowing laminar flow in a fluid comprising:

plated electrode plate rails including at least one of a anode and a cathode, wherein the plate rails have a radiused edge on an inlet side of the anode and cathode; and a conductive connecting end strap securing the anode and the cathode plates in a designated position, wherein the connecting end strap is positioned on a side of the electrode plate rails to allow laminar flow of water from a first end of the electrode plates to a second opposite end of the electrode plates.

17. The cell assembly of claim 16 wherein the plated material is selected from a group consisting of noble and transition metals.

18. The cell assembly of claim 16 wherein the anodes are coated with tin and the cathodes are coated with platinum.

19. A method of facilitating accelerated in situ bioremediation of a body of water, comprising:

positioning at least one of an in situ oxygen generating device having an electrochemical cell in the body of water;

flowing in situ fluid from the body of water into the electrochemical cell of the oxygen generating device;

passing an electric current through the electrochemical cell to create a process liquid in which hydrogen gas and oxygen gas are generated;

filtering chlorine from the water by converting available chlorine into chloride;

moving the process liquid through a quiet zone over a sufficient distance to allow the oxygen gas to dissolve into dissolved oxygen; and returning the liquid to the body of water.

20. The method of claim 19, further comprising reversing the polarity of the electric current flowing through the electrochemical cell to clean the cell.

21. The method of claim 20, further comprising inserting a casing into the well wherein a selected lower portion of the casing is perforated to allow liquid to flow through the casing.

22. The method of claim 19, wherein the body of water is an underground aquifer and the method further comprises drilling a borehole to form a well into the aquifer wherein a bottom of the borehole extends below a water table.

\* \* \* \* \*